(12) United States Patent
Kobayashi

(10) Patent No.: US 9,576,344 B2
(45) Date of Patent: Feb. 21, 2017

(54) NOISE REMOVAL SYSTEM, NOISE REMOVAL METHOD, AND PROGRAM

(71) Applicant: NEC Corporation, Minato-ku, Tokyo (JP)

(72) Inventor: Eita Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/441,896

(22) PCT Filed: Nov. 12, 2013

(86) PCT No.: PCT/JP2013/080558
§ 371 (c)(1),
(2) Date: May 11, 2015

(87) PCT Pub. No.: WO2014/077245
PCT Pub. Date: May 22, 2014

(65) Prior Publication Data
US 2015/0310593 A1    Oct. 29, 2015

(30) Foreign Application Priority Data

Nov. 13, 2012  (JP) .................. 2012-249069

(51) Int. Cl.
*G06K 9/40* (2006.01)
*G06T 5/00* (2006.01)
*G06T 5/10* (2006.01)

(52) U.S. Cl.
CPC ............ *G06T 5/002* (2013.01); *G06T 5/10* (2013.01); *G06T 2207/10004* (2013.01);
(Continued)

(58) Field of Classification Search
CPC ........ G06K 9/40; G06K 9/4619; G06K 9/527; H04N 1/409; H04N 1/58; H04N 5/21; H04N 19/86; G06T 5/002; G06T 5/10; G06T 5/20; G06T 2200/12; G06T 2207/10016; G06T 2207/20016; G06T 2207/20021; G06T 2207/10004; G06T 2207/10024; G06T 2207/20064; G06T 2207/20182

See application file for complete search history.

(56) References Cited

U.S. PATENT DOCUMENTS

| | | | | |
|---|---|---|---|---|
| 4,442,454 A | * | 4/1984 | Powell | G06T 5/20 348/618 |
| 4,523,230 A | * | 6/1985 | Carlson | H04N 5/21 348/623 |
| 7,308,152 B2 | * | 12/2007 | Ito | H04N 1/58 382/260 |

FOREIGN PATENT DOCUMENTS

| | | |
|---|---|---|
| JP | 2006-309749 A | 11/2006 |
| JP | 2007-188211 A | 7/2007 |

(Continued)

OTHER PUBLICATIONS

Hiroki Nakano et al., Ueburetto ni yoru singoshori to gazoshori [Wavelet-based Signals and Images Processing], Kyoritsu Shuppan, 1999, p. 10.

(Continued)

*Primary Examiner* — Jose Couso

(57) ABSTRACT

In order to make it possible to reduce the storage capacity required for noise removal processing in, for example, multi-resolution analysis and the like, without affecting signal quality, the present invention is equipped with: a storage device into which a input signal of a first channel is written, the input signal branching off into at least first and second channels; a first frequency transform processing unit which transforms the input signal read out and inputted from the storage device into a frequency-domain to output a first (Continued)

signal; a second frequency transform processing unit which transforms the input signal inputted from the second system into a frequency-domain to output a second signal; a third frequency transform processing unit which transforms the second input signal inputted from the second frequency transform processing unit into a frequency range to output a third and fourth signals in the first and second frequency bands; a first inverse frequency transform processing unit; and a second inverse frequency transform processing unit to which directly or indirectly inputting the third signal from the third frequency transform processing unit is directly or indirectly inputted and the fourth signal from the third frequency transform processing unit is inputted, and which outputs a third transformed signal produced through performing inverse frequency transform on the inputted signals. Therein, the first inverse frequency transform processing unit, to which the first signal from the first frequency transform processing unit is directly or indirectly inputted and the third converted signal from the second inverse frequency transform processing unit is directly or indirectly inputted, outputs a signal produced through performing inverse frequency transform on the inputted signals.

13 Claims, 13 Drawing Sheets

(52) U.S. Cl.
CPC ............... *G06T 2207/10016* (2013.01); *G06T 2207/10024* (2013.01); *G06T 2207/20016* (2013.01); *G06T 2207/20064* (2013.01); *G06T 2207/20182* (2013.01)

(56) References Cited

FOREIGN PATENT DOCUMENTS

| | | |
|---|---|---|
| JP | 2008-211627 A | 9/2008 |
| JP | 2009-77393 A | 4/2009 |

OTHER PUBLICATIONS

English Translation for Writen opinion of PCT/JP2013/080558.
International Search Report for PCT Application No. PCT/JP2013/080558, mailed on Feb. 18, 2014.

* cited by examiner

Fig. 10

| n | h(n) | g(n) |
|---|---|---|
| 0 | 0.602949018236357 | 1.115087052456990 |
| ±1 | 0.266864118442872 | −0.591271176311424 |
| ±2 | −0.078223266528988 | −0.057543526228500 |
| ±3 | −0.016864118442875 | 0.091271176311424 |
| ±4 | 0.026748757410810 | 0.000000000000000 |

NOISE REMOVAL SYSTEM, NOISE REMOVAL METHOD, AND PROGRAM

This application is a National Stage Entry of PCT/JP2013/080558 filed on Nov. 12, 2013, which claims priority from Japanese Patent Application 2012-249069 filed on Nov. 13, 2012, the contents of all of which are incorporated herein by reference, in their entirety.

TECHNICAL FIELD

Description on Related Application

The present invention is based on the priority claimed for Japanese Patent Application No. 2012-249069 (filed on Nov. 13, 2012), the entire content of which is incorporated herein by reference.

The present invention relates to a noise removal system, a noise removal method, and a program.

BACKGROUND ART

In data compression and noise removal processing on a digital signal, such as an image or a phonetic sound, transformation from discrete signals to frequency domain signals is often used. For example, JPEG (Joint Photographic Experts Group) uses the following steps:
Divide an image (still image) into blocks of a preset size.
Perform a discrete cosine transform (DCT) on each of the blocks to transform it from the spatial domain to the frequency domain.
Quantize signal components in the frequency domain to reduce information, and then perform the entropy coding using Huffman coding. These steps achieve compression (reduction in data amount).

JPEG-based compression achieves data compression having small influence against original images by performing quantization after the discrete cosine transform (DCT) to concentrate the signal's major energies on a low-frequency domain.

JPEG2000 uses a discrete wavelet transform (DWT) instead of the discrete cosine transform (DCT) (like JPEG, JPEG2000 performs entropy coding after transformation from the spatial domain to the frequency domain and quantization).

A wavelet transform separates each pixel value of an image into a low frequency component and a high frequency component. While the low-frequency component relatively preserves color information in the original image, the areas containing high-frequencies retain a portion which has a sharp transition in pixel values in the image, i.e., edge information of an object. A high-frequency component may include a noise component as well as the edge information of the image. Here, noise means color signals or the like mixed into an image caused by electric currents flowing between adjacent pixels when an image of an object is taken by an imaging device such as a CCD (Charge Coupled Device). The noise (referred to as "camera noise") arising from imaging devices appears on an image in the form of a distinct granular dot composed of several pixels. Thus, camera noise is often separated as a high-frequency component through wavelet transform processing. The camera noise is color information which is not inherent in the imaged object. Therefore it is preferable to remove the camera noise in order to obtain an image of the object with high fidelity.

The Wavelet Shrinkage method, which is a noise removal method employing a wavelet transform, is disclosed in, for example, Non-Patent Literature NPL 1. The Wavelet Shrinkage method is a method of removing noise by mainly utilizing the facts:
that a noise component is separated as a high-frequency component through a wavelet transform; and
that the camera noise is represented by signal values relatively weaker than that of the edge information inherent in the object.

As imaging devices improve in performance, images taken in high-sensitivity mode tend to produce much more camera noise. Thus, removing camera noise is becoming more important.

On the other hand, by improvement in quality as imaging devices improves in performance (e.g., sensitivity and resolution), calculation resources, such as memory capacity, and calculation time, which are required for noise removal, are tend to increase.

For example, in the Wavelet Shrinkage method, removing noise processing by a multi-resolution analysis where a plurality of wavelet transforms are carried out is generally used. This multi-resolution analysis is a technique used to cope with the problem that it is not possible to remove a noise component existing in a low-frequency component because a noise component is separated as a high-frequency component. In the multi-resolution analysis, among four components (i.e. one low-frequency component and three high-frequency components), into which an image is divided by a first wavelet transform, representing the resolution level 1, a wavelet transform is carried out on the low-frequency component, which results in the resolution level 2 and in seven divided domains. In this way, dividing is repeated so that the resolution level becomes higher. This makes it possible to remove low-frequency noise which is not possible to be separated by one wavelet transform.

FIG. 1 is an explanatory diagram illustrating a common art related to the Wavelet Shrinkage method employing the multi-resolution analysis. In the example illustrated in FIG. 1, a first coring processing unit 12 performs what is called wavelet shrinkage processing in which coring is performed on the high-frequency component separated from the input signal (original image) by the first wavelet-transform-processing unit 11, by threshold processing on wavelet expansion coefficients (for example, a coefficient whose absolute value is smaller than a threshold is replaced by 0). The result of wavelet shrinkage processing performed by the first coring-processing unit 12 is inputted to the first inverse-wavelet-transform-processing unit 13 (the coring processing unit is referred to also as "wavelet shrinkage processing unit"). The low-frequency component produced through separation by the first wavelet transform processing unit 11 is inputted to the second wavelet transform processing unit 14 to be separated into one low-frequency component and high-frequency components (images with resolutions (multi-resolutions) of different components are generated), and on the high-frequency components wavelet shrinkage is carried out by the second coring processing unit 15. The low-frequency component produced through separation by the second wavelet transform processing unit 14 and an output signal from the second coring processing unit 15 are inputted to the second inverse wavelet-transform processing unit 16. The result of an inverse wavelet transform performed by the second inverse wavelet transform-processing unit 16 is inputted to the first inverse wavelet transform-processing unit 13, and an output signal on which noise removal processing (denoise processing) is performed is outputted from the first inverse wavelet transform-processing unit 13. In this way, when the multi-resolution analysis is applied, different processes is performed on each component produced through separation by the first wavelet-transform-processing unit 11. Data has to be temporarily stored to match the timing of inputs to the first inverse-wavelet-transform-processing unit 13.

In the example (comparative example described later) shown in FIG. 2, a storage device 17 stores the data (an output from the first coring processing unit 12) after the wavelet shrinkage processing.

When the noise removal processing based on a multi-resolution analysis is implemented by a hardware circuit designed for real-time stream processing, the noise removal through wavelet shrinkage based on the multi-resolution analysis is able to be achieved by locating the storage device 17 shown in FIG. 2 as a buffer.

To improve performance of the noise removal based on the multi-resolution analysis, the number of wavelet transforms has to be increased. However, as the number of wavelet transforms increases, the deviation of timing for data input to the final inverse wavelet transform processing (the first inverse-wavelet-transform-processing unit 13 in FIG. 2) gets larger, more data is required to be stored in the storage device 17.

Therefore, to achieve much higher performance of noise removal through wavelet shrinkage, much larger storage capacity (e.g., the capacity of the storage device 17 in FIG. 2) is needed.

As noise components increase due to improvement of imaging devices in sensitivity, required performance of noise removal is becoming higher. At the same time, reduction in storage capacity of a storage device (e.g., the storage device 17 in FIG. 2) is also required.

Patent Literature PTL 1, which is a result of the related art literature search carried out by the applicant, discloses an imaging device which enables reduction in line memory significantly compared with the case where wavelet transforms are separately performed on the brightness signal and the color difference signal after these signals are generated. The imaging device according to PTL 1 includes a wavelet processing unit which performs wavelet transform processing, coring processing, and inverse wavelet transform processing on image signals. The wavelet processing unit includes: a wavelet decomposition processing unit which performs a wavelet transform on an image signal composed of a plural color signals; and a plurality of coring processing units which suppress signals satisfying different conditions after the wavelet transform, wherein the line memory directly stores the image signal composed of the plural color signals arranged in a preset arrangement, and the wavelet decomposition processing unit performs the wavelet transform on the image data stored in the line memory. Patent Literature PTL 2 discloses a configuration of: inputting an original image consisting of a plurality of pixels; decomposing the inputted image through multi-resolution conversion to generate a plurality of low-frequency images having sequentially lowering frequencies and high-frequency images having corresponding sequentially lowering frequencies; performing noise removal processing on each of the plurality of low-frequency images and the plurality of high-frequency images, which are generated; and obtaining a noise-removed image from the original image based on both results of the noise-removed low-frequency images and the noise-removed high-frequency images. Patent Literature PTL 3 discloses a noise reduction process in which a wavelet transforms is used as a technique of multi-resolution conversion. The noise reduction is achieved by carrying out a wavelet transform on original image data to obtain a plurality of frequency-band components, and then performing coring processing on each of the frequency-band components. The disclosed is obtaining image data on which noise-reduction processing is performed by recomposing, through an inverse wavelet transform, frequency-band components after coring processing, and generating corrected video signals by performing n-stage multi-resolution composition of a high-frequency component and a low-frequency component on which correction processing is performed. Patent Literature PTL 4 discloses an image processing device which: converts, by a coring processing unit, signals of very small amplitude in sub-band image signals including a high-frequency component transformed by a wavelet transform processing unit to 0; and, by an inverse wavelet transform processing unit, restores two image signals by composing a sub-band image signal which includes a low-frequency signal component and a sub-band image signal on which coring processing is performed in combination of different normal or reverse phases, synthesizes the two image signals at a certain phase, and outputs an edge waveform in an output image signal as an edge waveform in rotational symmetry. This consequently makes it possible to perform coring processing to reduce noise while suppressing blurred edges and phase shifting caused by the coring.

CITATION LIST

Patent Literature

PTL 1: Japanese Unexamined Patent Application Publication No. 2008-211627
PTL 2: Japanese Unexamined Patent Application Publication No. 2006-309749
PTL 3: Japanese Unexamined Patent Application Publication No. 2009-77393
PTL 4: Japanese Unexamined Patent Application Publication No. 2007-188211

Non Patent Literature

NPL 1: Hiroki Nakano, Shizuo Yamamoto, and Yasuo Yoshida, *Ueburetto ni yoru singoshori to gazoshori* [Wavelet-based Signals and Images Processing], Kyoritsu Shuppan, 1999, p. 10.

SUMMARY OF INVENTION

Technical Problem

Analyses of related arts are provided below.

As described above, noise removal processing by means of wavelet shrinkage involves frequency-domain transform processing (separation into low-frequency and high-frequency components (domains)), such as a wavelet transform, and shrinkage processing, such as wavelet shrinkage. After that, by performing an inverse wavelet transform to transform from the frequency domain to the spatial domain, a noise-removed image is provided.

Furthermore, it is possible to perform noise removal processing on noise mixed into a low-frequency component by a multi-resolution analysis in which noise removal processing is performed on a component with lower frequency by applying a wavelet transform again on the low-frequency component produced by a wavelet transform.

To improve an effect of noise removal by wavelet shrinkage, it is necessary to perform a plurality of wavelet transform processes, a plurality of wavelet shrinkage processes, and a plurality of inverse wavelet transform processes. Due to the necessity to perform these processes, an amount of calculation increases to further improve the noise removal effect. In addition, a storage device (17 in FIG. 2) is needed to store frequency components after separation. Required capacity for the storage device (17 in FIG. 2) increases as image quality of images improves.

For this reason, in a multi-resolution analysis, it is desired to reduce intermediate data (data amount), such as frequency components generated during, for example, noise removal through wavelet shrinkage, and to make it possible to suppress or to reduce increase of required storage capacity.

Accordingly, the present invention is invented based on the awareness of the above-described problem, and is aimed at providing a system, a method, and a program that is able to achieve reduction in storage capacity required for noise removal process through, for example, multi-resolution analyses without affecting quality of signals.

Solution to Problem

According to the present invention, a noise removal system is provided, the noise removal system including:

a storage device into which an input signal of a first channel is written, the input signal branching off into at least the first channel and a second channel at a branch unit;

a first frequency transform processing unit which transforms the input signal read out and inputted from the storage device into a frequency-domain signal to output a first signal;

a second frequency transform processing unit which transforms the input signal, which is inputted, of another channel into a frequency-domain signal to output a second signal;

a third frequency transform processing unit which transforms the second signal inputted from the second frequency transform processing unit into a frequency-domain signal to output a third signal and a fourth signal falling within a first frequency band and a second frequency band;

a first inverse frequency transform processing unit;

a second inverse frequency transform processing unit to which the third signal is inputted directly or indirectly from the third frequency transform processing unit and the fourth signal is inputted from the third frequency transform processing unit, and which outputs a third transformed signal produced through inverse frequency transform on inputted signals; and a first coring-processing unit and/or a second coring-processing unit, wherein the first inverse frequency transform processing unit, to which the first signal is inputted directly or indirectly from the first frequency transform processing unit and the third converted signal is inputted directly or indirectly from the second inverse frequency transform processing unit, outputs a signal produced through inverse frequency transform performed on inputted signals, the first coring processing unit outputs a first transformed signal produced through noise removal on the first signal from the first frequency transform processing unit, the first transformed signal from the first coring-processing unit being inputted as an indirect input of the first signal to the first inverse frequency transform processing unit, and the second coring processing unit outputs a second transformed signal produced through noise removal on the third signal from the third frequency transform processing unit, the second converted signal from the second coring processing unit being inputted as an indirect input of the third signal to the second inverse frequency transform processing unit.

According to another aspect of the present invention, a noise removal method is provided, the method including:

a process of temporarily writing into a storage device an input signal in a first channel, the input signal branching off into at least the first channel and a second channel;

a first frequency transform processing process of transforming the input signal read out from the storage device into a frequency-domain to generate a first signal;

a second frequency transform processing process of transforming the input signal of the second channel into a frequency-domain to generate a second signal;

a third frequency transform processing process of transforming the second signal into a frequency-domain to generate a third signal and a fourth signal in a first frequency band and a second frequency band;

a first inverse frequency transform processing process;

a second inverse frequency transform processing process, to which the third signal is directly or indirectly inputted and the fourth signal is inputted, of outputting a third transformed signal which is produced through inverse frequency transform performed on inputted signals, and a first coring processing process and/or a second coring processing process; wherein in the first inverse frequency transform processing process, the first signal is directly or indirectly inputted, the third transformed signal is directly or indirectly inputted, and a signal produced through inverse frequency transform performed on inputted signals is outputted, in the first coring-processing process, a first transformed signal is outputted, the first transformed signal being produced through noise removal on the first signal from the first frequency transform processing process, the first transformed signal from the first coring processing process being inputted in the first inverse frequency transform process as an indirect input of the first signal, and in the second coring processing process, a second transformed signal is outputted, the second transformed signal being produced through noise removal on the third signal from the third frequency transform processing process, the second transformed signal from the second coring processing process being inputted in the second inverse frequency transform processing process as an indirect input of the third signal.

According to still another aspect of the present invention, a program is provided, the program causing a computer to execute:

processing of writing temporarily into a storage device an input signal in a first channel, the input signal branching off into at least the first channel and a second channel;

first frequency transform processing, in which the input signal read out from the storage device is inputted, of transforming the signal into a frequency-domain to output a first signal;

second frequency transform processing, in which the input signal in another channel is inputted, of transforming the signal into a frequency-domain to output a second signal;

third frequency transform processing, in which the second signal from the second frequency-domain transform processing is inputted, of transforming the signal into a frequency-domain signal to output a third signal and a fourth signal in a first frequency band and a second frequency band;

first inverse frequency transform processing;

second inverse frequency transform processing, in which the third signal from the third frequency transform processing is directly or indirectly inputted and the fourth signal from the third frequency transform processing, of outputting a third transformed signal which is produced through inverse frequency transform performed on inputted signals; and first coring processing and/or second coring processing, wherein in the first inverse frequency transform processing, the first signal from the first frequency transform processing is directly or indirectly inputted, the third transformed signal from the second inverse frequency transform processing is directly or indirectly inputted, and a signal produced through inverse frequency transform performed on inputted signals is outputted, in the first coring processing, a first transformed signal is outputted, first transformed signal being produced through noise removal on the first signal from the first frequency transform processing, the first transformed signal from the first coring processing being inputted in the first inverse frequency transform processing as an indirect input of the first signal, and in the second coring processing, a second transformed signal is outputted, the second transformed signal produced through noise removal on the third signal from the third frequency transform processing, the second transformed signal from the second coring processing being inputted in the second inverse frequency transform processing as an indirect input of the third signal. According to the present invention, a storage medium, such as semiconductor memory or a magnetic/optical storage medium is provided, the storage medium storing the program.

Advantageous Effects of Invention

According to the present invention, it is possible to reduce storage capacity required for noise removal through, for example, multi-resolution analyses, without affecting image quality.

BRIEF DESCRIPTION OF DRAWINGS

FIG. 10 is a diagram showing CDF97 filter coefficients.

DESCRIPTION OF EMBODIMENTS

Figure 3:
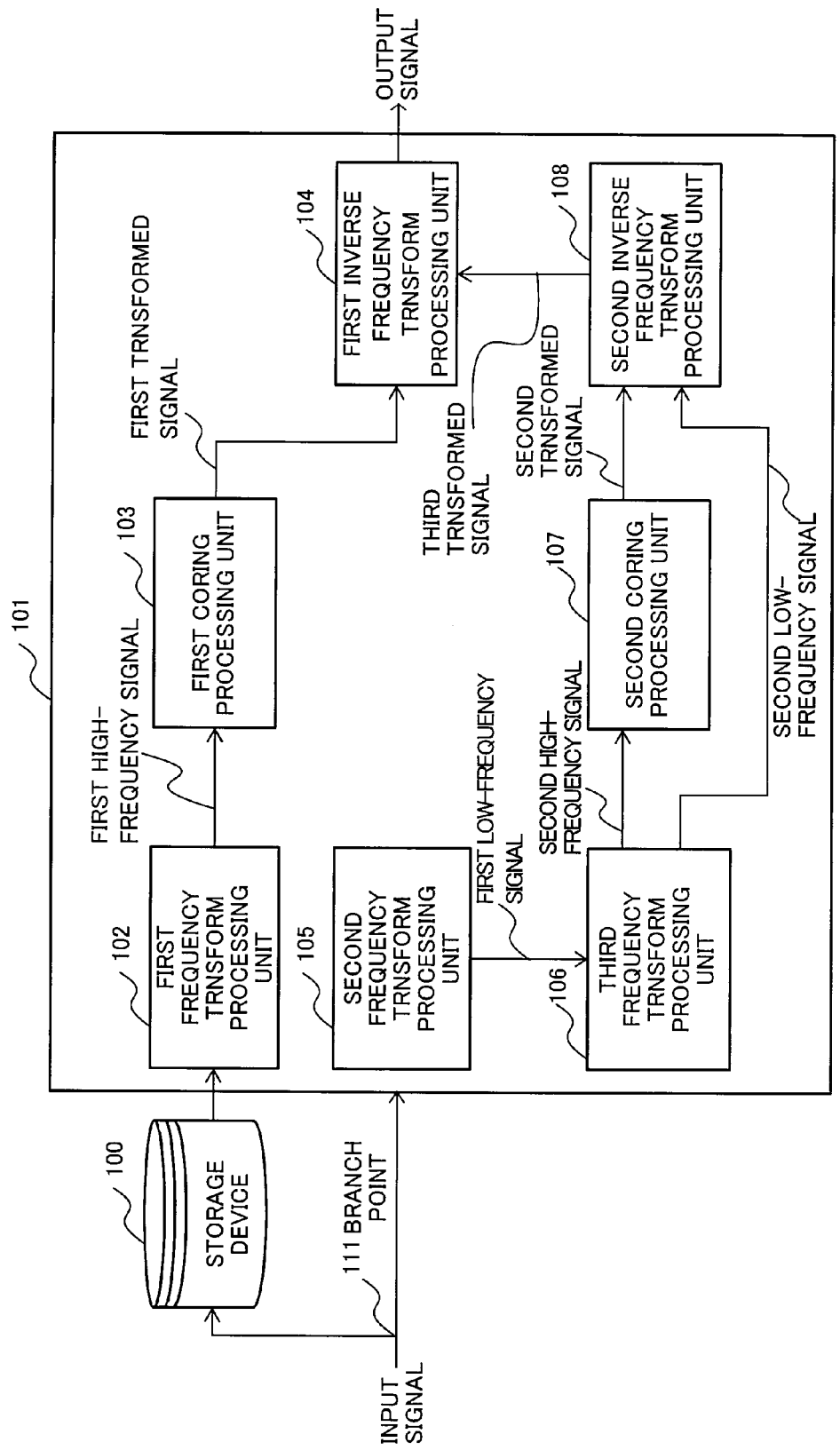
FIG. 3 is a diagram illustrating an example of a structure according to a first exemplary embodiment of the present invention.
Figure 5:
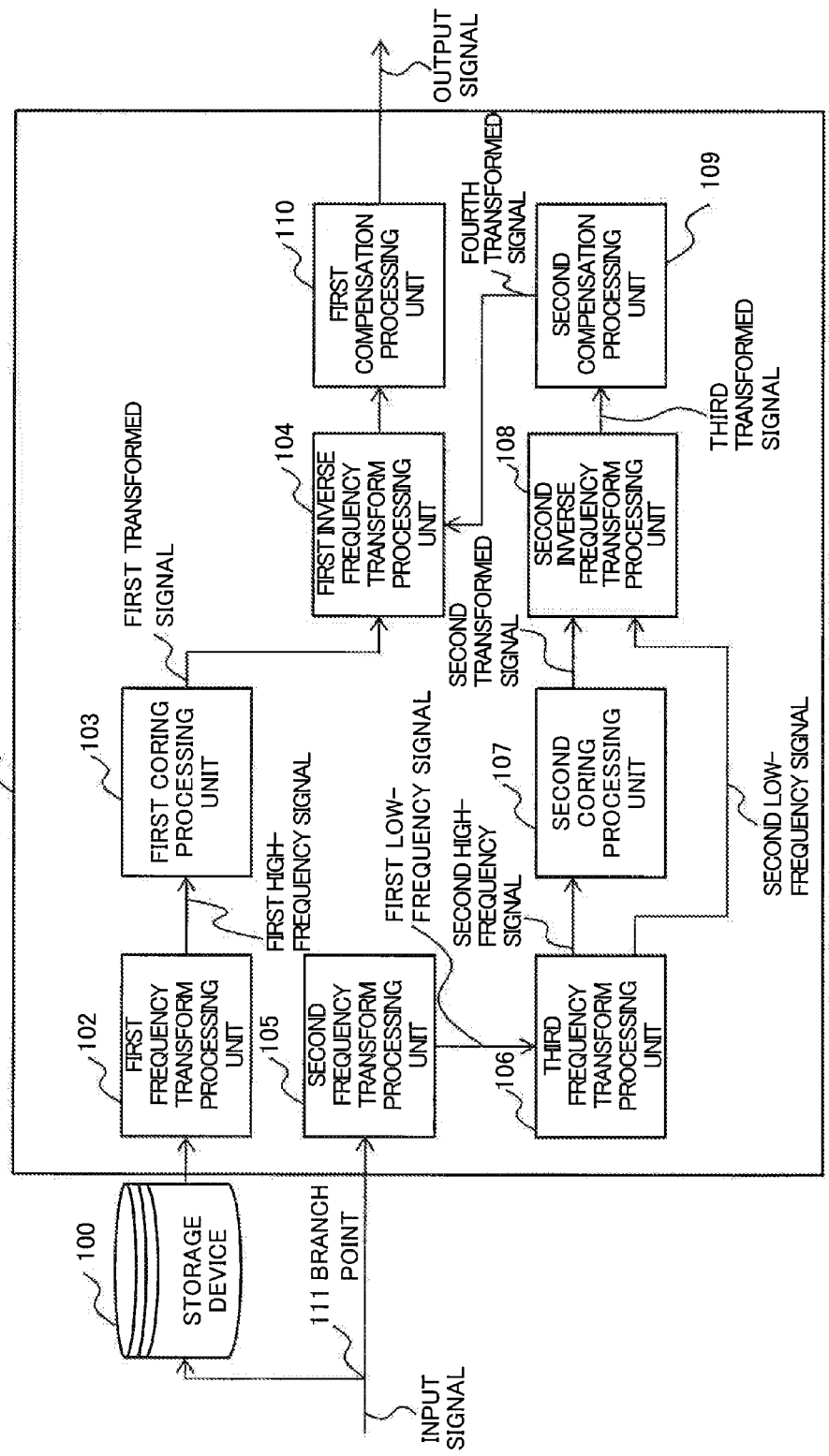
FIG. 5 is a diagram illustrating an example of a structure according to a second exemplary embodiment of the present invention.

According to some embodiments of the present invention, the provided includes:

a storage device (100 in FIGS. 3 and 5) which temporarily accumulates an input signal of a first channel, the input signal branching off into at least the first channel and a second channel at a branch point (branch unit) (111 in FIGS. 3 and 5);

a first frequency transform processing unit (102 in FIGS. 3 and 5) which transforms the input signal read out and inputted from the storage device (100 in FIGS. 3 and 5) into a frequency-domain signal to output a first signal (first high-frequency signal in FIGS. 3 and 5);

a first coring processing unit (103 in FIGS. 3 and 5) to which the first signal (first high-frequency signal in FIGS. 3 and 5) from the first frequency transform processing unit (102 in FIGS. 3 and 5) is inputted, and which outputs a first transformed signal (first transformed signal in FIGS. 3 and 5) that is produced through removal of a noise component from the first signal;

a second frequency transform processing unit (105 in FIGS. 3 and 5) which transforms the input signal, which is inputted, of the second channel into a frequency-domain to output a second signal (first low-frequency signal in FIGS. 3 and 5);

a third frequency transform processing unit (106 in FIGS. 3 and 5) which transforms the second signal (first low-frequency signal in FIGS. 3 and 5) from the second frequency transform processing unit (105 in FIGS. 3 and 5) into a frequency-domain to output a third signal and a fourth signal (second high-frequency signal and second low-frequency signal in FIGS. 3 and 5) in a first frequency band and a second frequency band;

a second coring processing unit (107 in FIGS. 3 and 5) to which the third signal (second high-frequency signal in FIGS. 3 and 5) from the third frequency transform processing unit (106 in FIGS. 3 and 5) is inputted, and which outputs a second transformed signal (second transformed signal in FIGS. 3 and 5) that is produced through removal of a noise component from the third signal;

a first inverse frequency transform processing unit (104 in FIGS. 3 and 5); and a second inverse frequency transform processing unit (108 in FIGS. 3 and 5) to which both the second transformed signal from the second coring processing unit (107 in FIGS. 3 and 5) and the fourth signal (second low-frequency signal in FIGS. 3 and 5) from the third frequency transform processing unit (106 in FIGS. 3 and 5) is inputted, and which outputs a third transformed signal (third transformed signal in FIGS. 3 and 5) that is produced through inverse frequency transform on the inputted signals, wherein the first inverse frequency transform processing unit (104 in FIGS. 3 and 5), to which inputs the first transformed signal from the first coring processing unit (103 in FIGS. 3 and 5) is inputted and the third transformed signal from the second inverse frequency transform processing unit (108 in FIGS. 3 and 5) is directly or indirectly inputted, outputs a signal produced through inverse frequency transform performed on these inputted signals. Alternatively, it is also possible to use a structure including at least one of the first coring processing unit (103 in FIGS. 3 and 5) and the second coring processing unit (107 in FIGS. 3 and 5).

According to some embodiments of the present invention, the input signal is read out from the storage device (100 in FIGS. 3 and 5) and inputted to the first frequency transform processing unit (102 in FIGS. 3 and 5) so that the first transformed signal from the first coring processing unit (103 in FIGS. 3 and 5) is inputted to the first inverse frequency transform processing unit (104 in FIGS. 3 and 5) at a timing when the third transformed signal (third transformed signal in FIGS. 3 and 5) from the second inverse frequency transform processing unit (108 in FIGS. 3 and 5) is directly or indirectly inputted to the first inverse frequency transform processing unit (104 in FIGS. 3 and 5).

According to one of embodiments of the present invention, it is also possible to use a structure including: a first compensation processing unit (110 in FIG. 5) which outputs a signal that is produced through preset correction and/or further noise removal processing on the signal outputted from the first inverse frequency transform processing unit (104 in FIG. 5); and a second compensation-processing unit (109 in FIG. 5) which outputs a fourth transformed signal (fourth transformed signal in FIG. 5) that is produced through preset correction and/or further noise removal processing on the third transformed signal (third transformed signal in FIG. 5) outputted from the second inverse frequency transform processing unit (108 in FIG. 5).

A path along which the third transformed signal (third transformed signal in FIG. 5) from the second inverse frequency transform processing unit (108 in FIG. 5) is indirectly inputted to the first inverse frequency transform processing unit (104 in FIG. 5) may be the path along which:

the third transformed signal (third transformed signal in FIG. 5) from the second inverse frequency transform processing unit (108 in FIG. 5) is inputted to the second compensation processing unit (109 in FIG. 5); and the fourth transformed signal from the second compensation processing unit (109 in FIG. 5) is inputted to the first inverse frequency transform processing unit (104 in FIG. 5).

Figure 11:
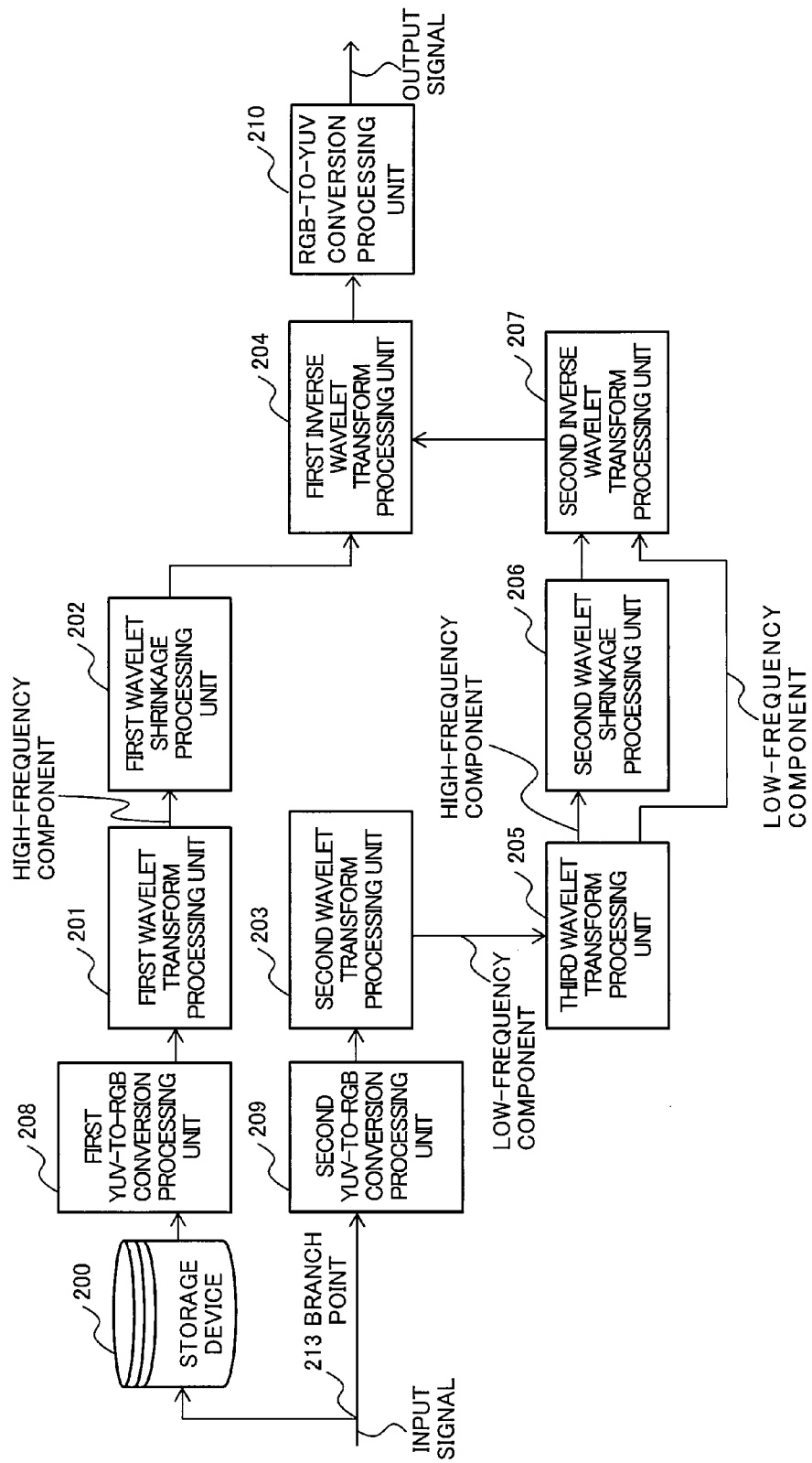
FIG. 11 is a diagram illustrating an example of a structure of a second example of the present invention.

According to one of the embodiments of the present invention, it is also possible to use a structure including:

a first conversion processing unit (first YUV-to-RGB conversion processing unit 208 in FIG. 11) which performs preset designated color space conversion processing on the input signal of the one channel, the input signal being read out from the storage device (200 in FIG. 11), and supplies, as the input signal, a signal produced through the color space conversion processing to the first frequency transform processing unit (first wavelet transform processing unit 201 in FIG. 11); and a second conversion processing unit (second YUV-to-RGB conversion processing unit 209 in FIG. 11) which performs preset designated color space conversion processing on the input signal of the other channel, and supplies, as the input signal, a signal produced through the conversion processing to the second frequency transform processing unit (second wavelet transform-processing unit 203 in FIG. 11).

According to the present invention, a configuration is set so as to adjust the timing of reading an input signal by the storage device (100 in FIGS. 3 and 5, and 200 in FIGS. 7, 8, 11, and 13) temporarily retaining the input signal. Accordingly, adjustment of the timing of signals inputted to the first inverse frequency transform processing unit (104 in FIGS. 3 and 5, and 204 in FIGS. 7, 8, 11, and 13) is performed without being affected by an increase in data amount, and it is made possible to reduce storage capacity of the storage device required for storing data.

When a bit precision of pixel data is raised to process an input image internally, in particular, when required bit precision is raised for an internal process, such as image format conversion or frequency domain conversion, according to the present invention, it is possible to reduce necessary storage capacity without data loss by, for example, storing the inputted pixel data at low bit precision into a storage device (e.g., 100 in FIGS. 3 and 5, and 200 in FIGS. 7, 8, 11, and 13) and then by carrying out a necessary internal process on the data read out from the storage device.

First Exemplary Embodiment

FIG. 3 is a diagram illustrating an example structure according to a first exemplary embodiment of the present invention. The structure includes a storage device 100 and a processing device 101.

An input signal, which branches off at a branch point (branch unit) 111 into at least two channels, of one of the channels is written to the storage device 100, which temporarily stores the written input signal.

The processing device 101 includes:

a first frequency transform processing unit 102 which transforms the input signal read out from the storage device 100 into a frequency-domain to output a first high-frequency signal;

a first coring processing unit 103 which performs coring processing on the first high-frequency signal, as an input, from the first frequency transform processing unit 102 to output a first transformed signal;

a second frequency transform processing unit 105 which transforms the input signal of another channel in the two channels into a frequency-domain to output a first low-frequency signal;

a third frequency transform processing unit 106 which performs frequency transform on the first low-frequency signal, as an input, from the second frequency transform processing unit 105 to output a second high-frequency signal and a second low-frequency signal;

a second coring processing unit 107 which performs coring processing on the second high-frequency signal, as an input, from the third frequency transform processing unit 106 to output a second transformed signal;

a second inverse frequency transform processing unit 108 which performs inverse frequency transform on the second transformed signal from the second coring processing unit 107 and the second low-frequency signal from the third frequency transform processing unit 106, as an input, to output a third converted signal; and a first inverse frequency transform processing unit 104 which performs inverse frequency transform on the third converted signal from the second inverse frequency transform processing unit 108 and the first transformed signal from the first coring processing unit 103, as an input, to output an output signal.

Although not limited, the processing device 101 may be configured with an arithmetic unit, such as a central processing unit (CPU) or a microprocessor, and a semiconductor integrated circuit (IC). Alternatively, the processing device may be configured with a computer, such as a personal computer (PC), a thin client terminal/server, a workstation, a mainframe, or a supercomputer.

Although not limited also, the storage device 100 may be configured with a memory device, such as a RAM (random access memory) or an electrically rewritable ROM like EEPROM (electrically erasable and programmable read-only memory); an external storage device such as a HDD (hard disk drive) or an SSD (solid state drive); a storage medium such as a DVD (digital versatile disk) or a memory card; a memory device installed in a peripheral device (e.g., external HDD) or in an external server (e.g., storage server); or a network attached storage (NAS) connected via a network (not shown).

General operations of the individual units according to the first exemplary embodiment will now be described with reference to FIG. 3.

Each of the first frequency transform processing unit 102, the second frequency transform processing unit 105, and the third frequency transform processing unit 106 transforms an inputted signal into a frequency-domain signal. The inputted signal mentioned above may be, for example, image data taken and created by an imaging device (not shown). The input signal to the third frequency transform processing unit 106 is a frequency-domain signal (a first low-frequency signal) produced through transforming by the second frequency transform processing unit 105.

The first frequency transform processing unit 102, the second frequency transform processing unit 105, and the third frequency transform processing unit 106 perform, for example, a wavelet transform, a sine transform, a cosine transform, a Fourier transform, or a fast Fourier transform. When the input signal is a discrete signal, they perform, for example, a discrete wavelet transform, a discrete sine transform, a discrete cosine transform, a discrete Fourier transform, or a fast Fourier transform. When the input signal is an image signal, they perform, for example a two-dimensional bi-orthogonal wavelet transform or a two-dimensional cosine transform (not limited to those).

The first coring-processing unit 103 performs coring processing on the first high-frequency signal outputted from the first frequency transform processing unit 102. The second coring processing unit 107 performs coring processing on the second high-frequency signal outputted from the third frequency transform processing unit 106. It may be determined whether to be a high-frequency signal by, for example, comparing with a preset designated frequency (e.g., a signal whose frequency is equal to or greater than the preset designated frequency is estimated to be a high-frequency signal (a high-frequency component)).

The first coring processing unit 103 and the second coring processing unit 107 output the first transformed signal and the second transformed signal, respectively, which are produced through removing noise components from the inputted high-frequency components. Wavelet shrinkage is performed as coring processing, and in wavelet shrinkage, absolute values of the inputted first and second transformed signals are compared with a preset threshold value, and a value equal to or less than the threshold is shrunk to 0. The wavelet shrinkage may be shrinkage (hard shrinkage) in which a value equal to or less than the threshold is shrunk to 0 only or shrinkage (soft shrinkage) in which a value equal to or less than the threshold is shrunk to 0 and a value greater than the threshold is corrected. Alternatively, in the coring processing may be processing in which a value equal to or less than the threshold is shrunk not to 0 but to a constant value. The coring processing may also be LPF (Low-Pass Filter), HPF (High-Pass Filter), BPF (Band Pass Filter) or BSF (Band Stop Filter). The BPF and BSF may be implemented using a digital filter of IIR (Infinite Impulse Response) or FIR (Finite Impulse Response) type (however, the coring processing is not limited to the foregoing).

The second inverse frequency transform processing unit 108 performs inverse frequency transform on the second transformed signal outputted from the second coring processing unit 107 and the second low-frequency signal outputted from the third frequency transform processing unit 106, which are inputted, to output a third converted signal.

The first inverse frequency transform processing unit 104 performs inverse frequency transform on the third transformed signal outputted from the second inverse frequency transform processing unit 108 and the first transformed signal outputted from the first coring processing unit 103, which are inputted, to output an output signal.

In the present exemplary embodiment, the individual units 102 to 108 may be configured so that part or whole of their processes and functions are implemented by a computer program executed on the processing device 101. According to the present invention, there are provided the computer program and a storage medium storing the program, such as a semiconductor memory device or a magnetic/optical disk.

General operations of the present exemplary embodiment 1 illustrated in FIG. 3 will now be described with reference to the flowchart in FIG. 4. An input signal is inputted (Step A01). The input signal branches off into two channels, and then on the input signal of one of the channels, the second frequency transform processing unit 105 performs second frequency-domain transform processing (Step A02).

The storage device 100 temporarily stores the input signal (Step A06). When the input signal is an image signal, the storage device 100 temporarily stores the input signal that is inputted on a line-by-line basis.

The third frequency transform processing unit 106 performs third frequency-domain transform processing on a low-frequency component of the frequency-domain signal produced through transform performed in Step A02 (Step A03).

The second coring processing unit 107 performs second coring processing on a high-frequency signal, which is a high-frequency component of the frequency-domain signal produced through transform performed by the third frequency transform processing unit 106, and outputs a second transformed signal from which noise is removed (Step A04).

The second inverse frequency transform processing unit 108 performs inverse frequency transform processing using the second low-frequency signal which is a low-frequency component of the frequency-domain signal outputted from the third frequency transform processing unit 106 in Step A03 and the second transformed signal which is outputted from the second coring-processing unit 107 in Step A04, and outputs a third transformed signal to the first inverse frequency transform processing unit 104 (Step A05).

It is preferable that the first transformed signal from the first coring processing unit 103 is outputted to the first inverse frequency transform processing unit 104 at the timing of (in synchronization with) the third transformed signal being outputted from the second inverse frequency transform processing unit 108 to the first inverse frequency transform processing unit 104. For this reason, in the present exemplary embodiment, the input signal stored in the storage device 100 is read out at the right timing and inputted to the first frequency transform processing unit 102, and the frequency-domain transform processing is performed (Step A07).

It is also possible to use a configuration in which the storage device 100 is accessed for readout of the input signal, which is then inputted to the first frequency transform processing unit 102, at a time when a certain period, e.g., a delay time, has elapsed after the input signal is written to the storage device 100, where the delay time=time 2−time 1, which is a difference (provided that time 2>time 1) between the sum (=time 1) of the time for accessing and reading from the storage device 100 and the time (including transfer time between units) for processing performed by the first frequency transform processing unit 102 and the first coring-processing unit 103, with respect to the input signal, which branches off into two channels, of one of the channels, and the sum (=time 2) of the time (including transfer time between units) for processing performed by the second frequency transform processing unit 105, the third frequency transform processing unit 106, the second coring processing unit 107, and the second inverse frequency transform processing unit 108, with respect to the input signal, which branches off into the two channels, of another channel of the two channels.

In this case, the storage device 100 may be configured to implement a control which adjusts the timing so that an input signal is read out after elapse of a certain time since the input signal is written (for example, the control may be implemented using a buffer memory that is based on the First-In First-Out control method).

Alternatively, a controller (not shown) may be included for the above-described synchronization control in the storage device 100.

Alternatively, the synchronization may be controlled by sending a control signal which triggers reading out to the storage device 100 at the timing when a third transformed signal is outputted from the second inverse frequency transform processing unit 108.

The first coring processing is performed on a high-frequency component of the signal, on which frequency transform processing has been performed, outputted from the first frequency transform processing unit 102 (Step A08).

As seen above, the right timing of Step A07 causes Step A05 and Step A08 to output their processing results simultaneously to proceed to the processing in the first inverse frequency transform processing unit 104 (Step A09).

A processing result in Step A09 is outputted and accordingly a noise-removed signal (a first inverse frequency-domain transformed signal) is obtained from the first inverse frequency transform processing unit 104 (Step A10).

According to the present exemplary embodiment, it is possible to achieve noise removal processing which reduces the capacity of the storage device required for timing adjustment during a multi-resolution analysis while avoiding deterioration of image quality, owing to the configuration where an input signal, for example, at its lowest bit precision is temporarily stored in the storage device and is read out at the right timing.

Second Exemplary Embodiment

Figure 6:
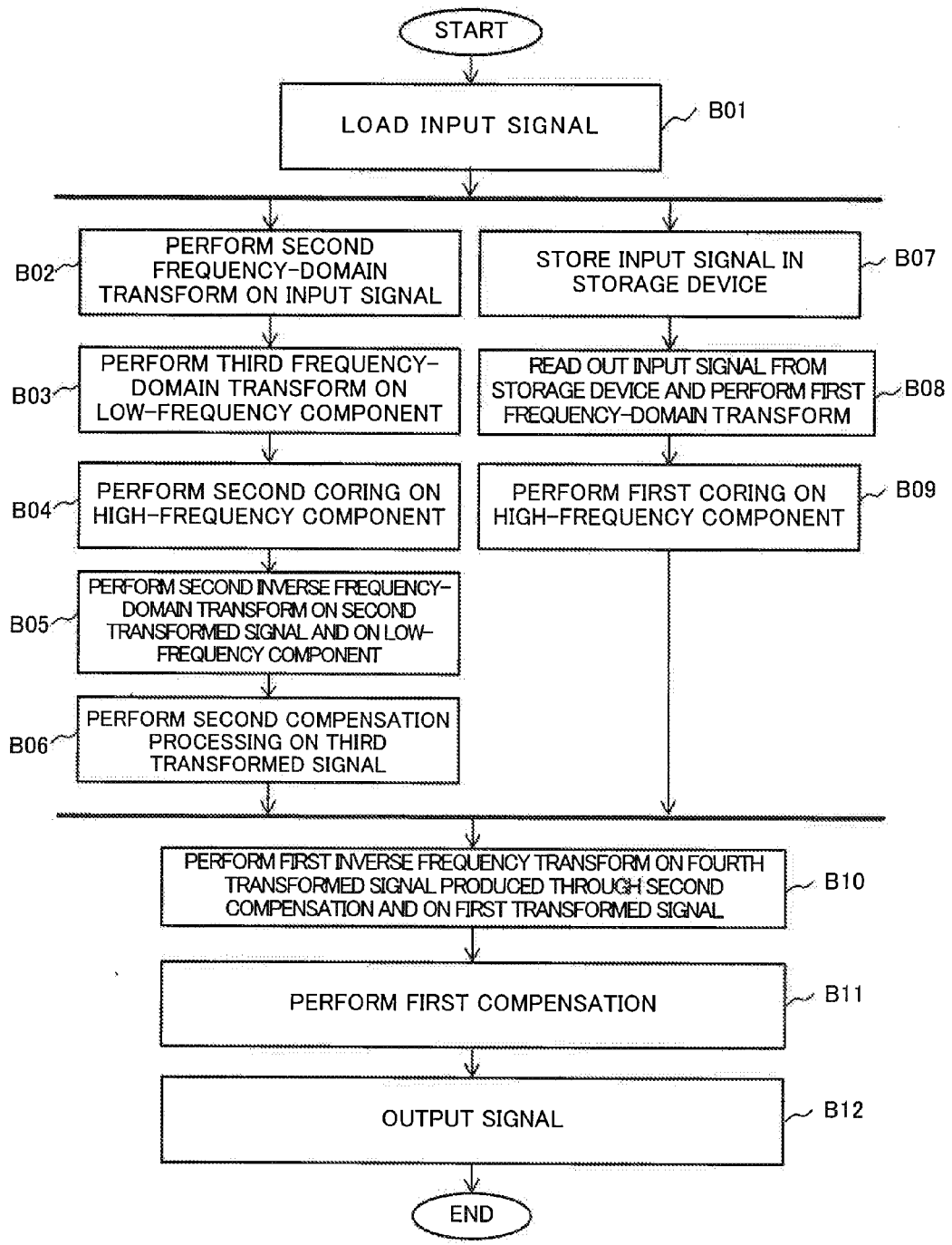
FIG. 6 is a flowchart showing operations of the second exemplary embodiment of the present invention.

FIG. 5 is a diagram illustrating an example of a structure according to a second exemplary embodiment of the present invention. FIG. 6 is an explanatory flowchart showing operations of the second exemplary embodiment. With reference to FIG. 5, the second exemplary embodiment of the present invention further includes a first compensation processing unit 110 and a second compensation processing unit 109 in addition to the structure in FIG. 4. Another difference is that inputs to the first inverse frequency transform processing unit 104 are the first transformed signal outputted from the first coring processing unit 103 and a fourth transformed signal outputted from the second compensation processing unit 109.

The second compensation processing unit 109, to which the third transformed signal from the second inverse frequency transform processing unit 108 is inputted, outputs the fourth transformed signal to the first inverse frequency transform processing unit 104, and an output signal from the first inverse frequency transform processing unit 104 is inputted to the first compensation processing unit 110.

The first compensation processing unit 110 and the second compensation processing unit 109 perform processing such as:

correction processing, e.g., restoring or processing an image; and additional noise removal processing which enhances performance of noise removal.

In the present exemplary embodiment, the correction processing includes, but is not limited to, at least one of:

edge enhancement processing, e.g., unsharp mask filtering processing, which is able to correct edge rounding in an image caused by noise removal processing;

optical correction, e.g., correcting lens distortion; and color correction.

As additional noise removal, arbitrary noise removal (reduction) processing may be applied. For example, a bilateral filter may be used. That is, for a blur or the like, in an image, caused by noise removal during wavelet shrinkage, blurred edges are able to be prevented to some extent by, for example, a bilateral filter where, in noise reduction, a value of a pixel is replaced by a weighted average of values of nearby pixels, the weight being greater for more similar colors and shorter distances.

In the present exemplary embodiment, the individual units 102 to 110 may be configured so that part or whole of their processes and functions are implemented by a computer program executed on the processing device 101. According to the present invention, there are provided the computer program and a storage medium storing the program, such as a semiconductor memory device or a magnetic/optical disk.

FIG. 6 is an explanatory flowchart showing operations of the second exemplary embodiment illustrated in FIG. 5. Operations of the second exemplary embodiment of the present invention are described below with reference to FIG. 6.

Figure 4:
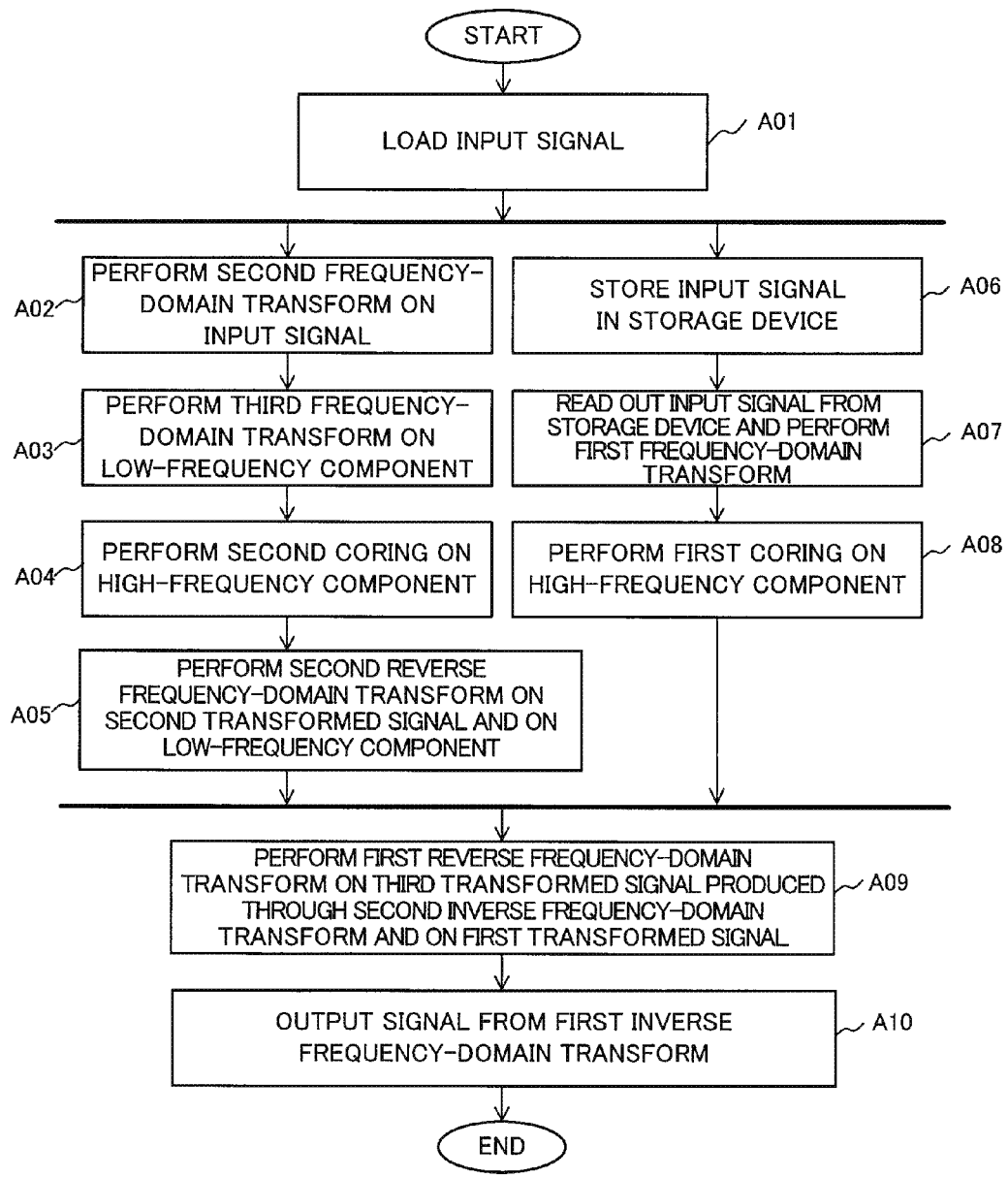
FIG. 4 is a flowchart showing operations of the first exemplary embodiment of the present invention.

Steps B01 to B05 in FIG. 6 are the same as Steps A01 to A05 in FIG. 4.

On an output signal from the second inverse frequency transform processing in Step B05, the second compensation processing unit 109 performs second correction processing (Step B06).

Step B07 in FIG. 6 is the same as Step A06 in FIG. 4; an input signal branches off into two channels and then is stored. The processes from Step B02 to Step B06 are carried out, and then a fourth transformed signal is outputted from the second compensation processing unit 109 to the first inverse frequency transform processing unit 104.

It is preferable that the first transformed signal from the first coring processing unit 103 is outputted to the first inverse frequency transform processing unit 104 at the timing of the fourth transformed signal being outputted from the second compensation processing unit 109 to the first inverse frequency transform processing unit 104.

For this reason, in the present exemplary embodiment, the input signal stored in the storage device 100 is read out to the first frequency transform processing unit 102 so that the first transformed signal from the first coring processing unit 103 is outputted to the first inverse frequency transform processing unit 104 at the timing when the fourth transformed signal is outputted from the second compensation processing unit 109 to the first inverse frequency transform processing unit 104 (Step B08).

It is possible to use a configuration, in which an input signal written to the storage device 100 in one of the channels is read out at a time when a delay time has elapsed after the writing and then inputted to the first frequency transform processing unit 102, where the delay time=time 2−time 1, which is a difference (provided that time 2>time 1) between:

the sum (=time 1) of the access time for reading from the storage device 100 and the time (including transfer time between units) for processing performed by the first frequency transform processing unit 102 and the first coring processing unit 103, with respect to the input signal, which branches off into the two channels, of one of the channels; and the sum (=time 2) of the time (including transfer time between units) for processing performed by the second frequency transform processing unit 105, the third frequency transform processing unit 106, the second coring processing unit 107, the second inverse frequency transform processing unit 108, and the second compensation processing unit 109, with respect to the input signal, which branches off into the two channels, of another of the channels. In this case, the storage device 100 may be configured to implement a control which adjusts the timing so that an input signal is read out after elapse of a certain time has elapsed since the input signal is written (for example, the control may be implemented using a buffer memory that is based on the First-In First-Out control method). Alternatively, a controller (not shown) may be included for the above-described synchronization control in the storage device 100. Alternatively, the synchronization may be controlled by sending a control signal which triggers reading out to the storage device 100 at the timing when a third transformed signal is outputted from the second inverse frequency transform processing unit 108.

The first coring processing unit 103 performs coring processing on the first high-frequency signal outputted from the first frequency transform processing unit 102 (Step B09).

The first inverse frequency transform processing unit 104 applies inverse frequency transform on the first transformed signal and the fourth transformed signal (Step B10).

The first compensation processing unit 110 performs compensation processing on a processing result from the first inverse frequency transform processing unit 104 (Step B11).

The first compensation processing unit 110 outputs a result of compensation processing and accordingly a noise-removed image signal is obtained from the first compensation processing unit 110 (Step B12).

According to the second exemplary embodiment, higher image quality is expected owing to the configuration in which compensation processing is added to the above first exemplary embodiment.

Concerning an increase in storage capacity for correction processing, it is possible to obtain an image of higher quality while reducing the capacity of the storage device required for timing adjustment by configuring so that, for example, an input signal at its lowest bit precision is temporarily retained in the storage device 100 and is read out to the first frequency transform processing unit 102 at the right timing.

Example 1

Figure 7:
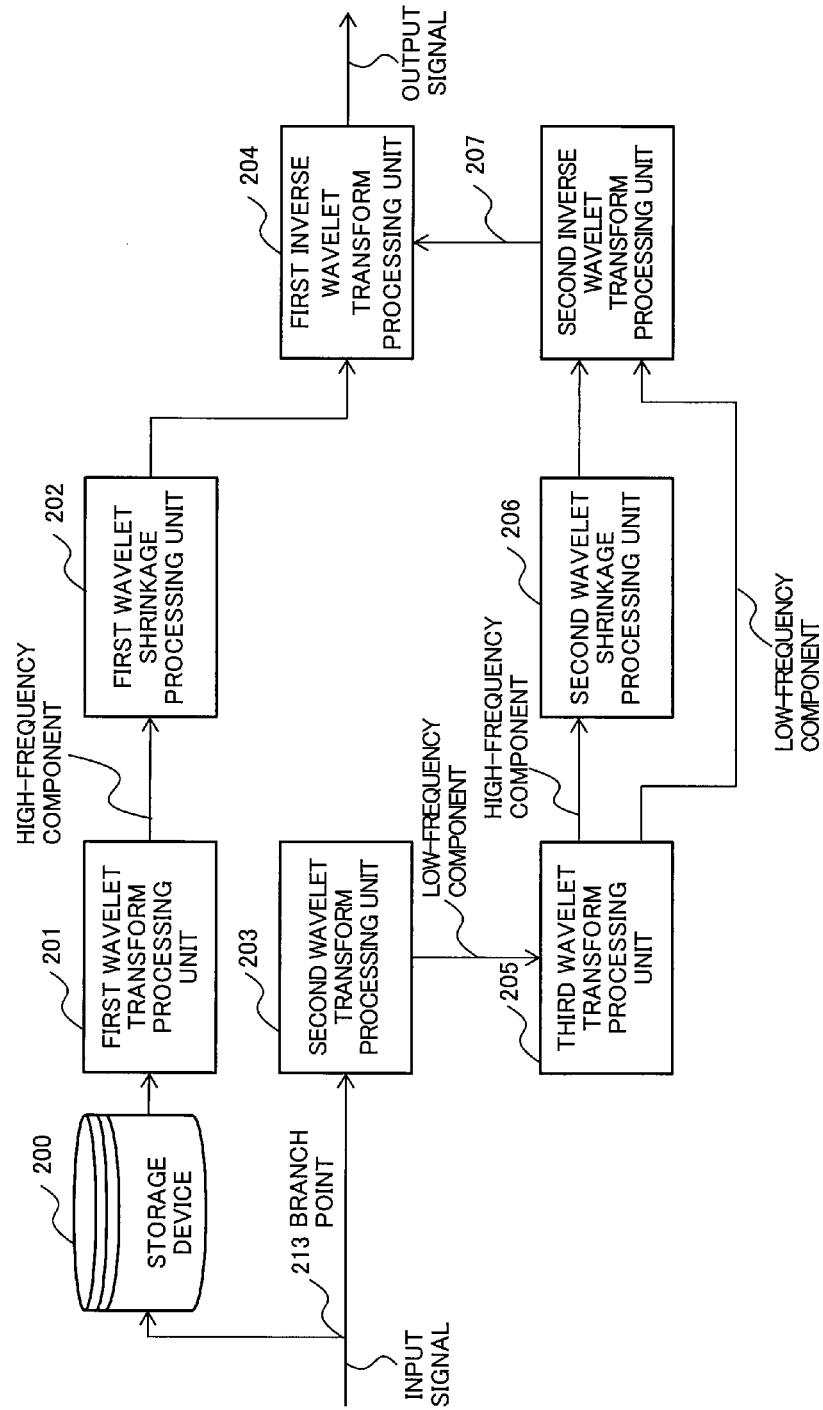
FIG. 7 is a diagram illustrating an example of a structure of a first example of the present invention.
Figure 8:
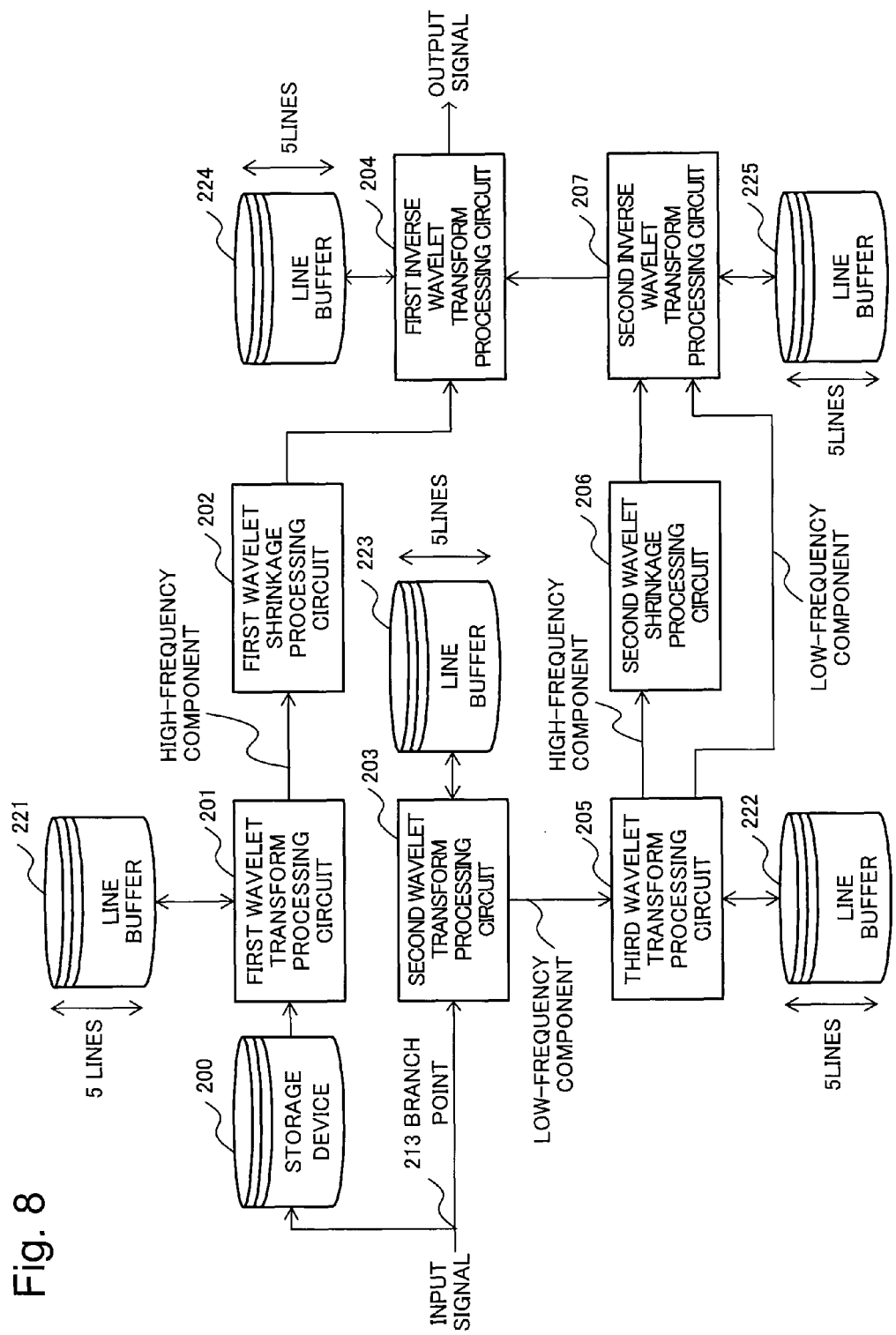
FIG. 8 is a diagram illustrating the first example of the present invention as circuit blocks.

FIG. 7 is a diagram illustrating an example of a structure of a first example. The first example corresponds to the first exemplary embodiment described above. FIG. 8 is a circuit block diagram illustrating the first example. In the first example, wavelet transform processing and inverse wavelet transform processing are respectively performed as the frequency transform processing and the inverse frequency transform processing of the above-described first exemplary embodiment.

In FIG. 7, a storage device 200, a first wavelet transform processing unit 201, a second wavelet transform processing unit 203, a third wavelet transform processing unit 205, a first wavelet shrinkage processing unit 202, a second wavelet shrinkage processing unit 206, a first inverse wavelet transform-processing unit 204, a second inverse wavelet transform processing unit 207, and a branch point (branch unit) 213 correspond to, in FIG. 3, the storage device 100, the first frequency transform processing unit 102, the second frequency transform processing unit 105, the third frequency transform processing unit 106, the first coring processing unit 103, the second coring processing unit 107, the first inverse frequency transform processing unit 104, the second inverse frequency transform processing unit 108, and the branch point (branch unit) 111, respectively.

With reference to FIGS. 7 and 8, a signal is outputted from the first wavelet shrinkage processing unit (circuit) 202 to the first inverse wavelet-transform processing unit (circuit) 204 at the same time as a signal is outputted from the second inverse wavelet transform processing unit (circuit) 207 to the first inverse wavelet transform processing unit (circuit) 204. An input signal stored and retained in the storage device 200 is read out and inputted to the first wavelet transform-processing unit 201 at the right timing.

It goes without saying that a configuration, in FIG. 7, may further include a fourth wavelet transform processing unit (not shown) to which a low-frequency component coming from the third wavelet-transform-processing unit 205 is inputted, a third wavelet shrinkage processing unit (not shown) which receives a high-frequency component from the forth wavelet transform processing unit and removes noise, and a third inverse wavelet transform processing unit (not shown) which receives an output from the third wavelet shrinkage-processing unit and a low-frequency component from the wavelet transform processing unit. The same applies to other examples described below. An image is divided into four components (one low-frequency component and three high-frequency components) by the second wavelet transform processing unit 203, is divided into seven areas at the resolution level 2 by the third wavelet transform processing unit 205 to which the low-frequency component is inputted, and is divided into ten areas at the resolution level 3 by the fourth wavelet transform processing unit. Furthermore, it goes without saying that it is also possible to use a multi-stage structure including a wavelet transform processing unit to which a low-frequency component is inputted from the fourth wavelet transform processing unit (not shown), a wavelet shrinkage processing unit, and an inverse wavelet transform processing unit.

An input signal is inputted by the line (raster unit: one line of a raster format image) of an image in a horizontal direction (row direction). With reference to FIG. 8, in order to achieve two-dimensional wavelet transforms, the wavelet transform processing circuits 201, 203, and 205 and the inverse wavelet transform processing circuits 204 and 207 have line buffers 221, 223, 222, 224, and 225, respectively. The number of lines accumulated in the individual line buffers differs depending on the type of a wavelet basis (mother wavelet) for a wavelet transform. For CDF97 (Cohen-Daubechies-Feauveau 9-7) wavelet, the number of required lines is 5.

An increase in bit precision caused by internal processing of an input signal is described below with a comparative example in FIG. 9. It is assumed as an example that the input signal is a two-dimensional 1920×1080 image in the YUV422 format, in which each of the Y component (luminance), the U component (difference between luminance and blue component), and the V component (difference between luminance and red component) component is of 8 bits. Note that, in the YUV422 format, when sampling is performed, four samples are taken for a Y component and two samples are taken for U and V components each, each sample set consists of adjacent 4 (2×2) pixels, the Y component has 8 bits independently for each pixel and the U component and the Y component shares 8 bits between adjacent pixels. Thus, the number of bits per pixel is 16. However, as described later, the number of bits of data may be greater than 16 for internal processing.

FIG. 10 shows wavelet coefficients (CDF97 filter: coefficients of linear phase filter) by which an original signal is multiplied for CDF97 wavelet. Wavelet transforms on discrete signals are achieved by sequentially multiplying integer values representing an original signal s(n) by these high precision coefficients (filter banks h(n), g(n)). In order to ensure the operation accuracy, a bit width is needed to hold a reasonable fractional value in addition to the integer.

Figure 9:
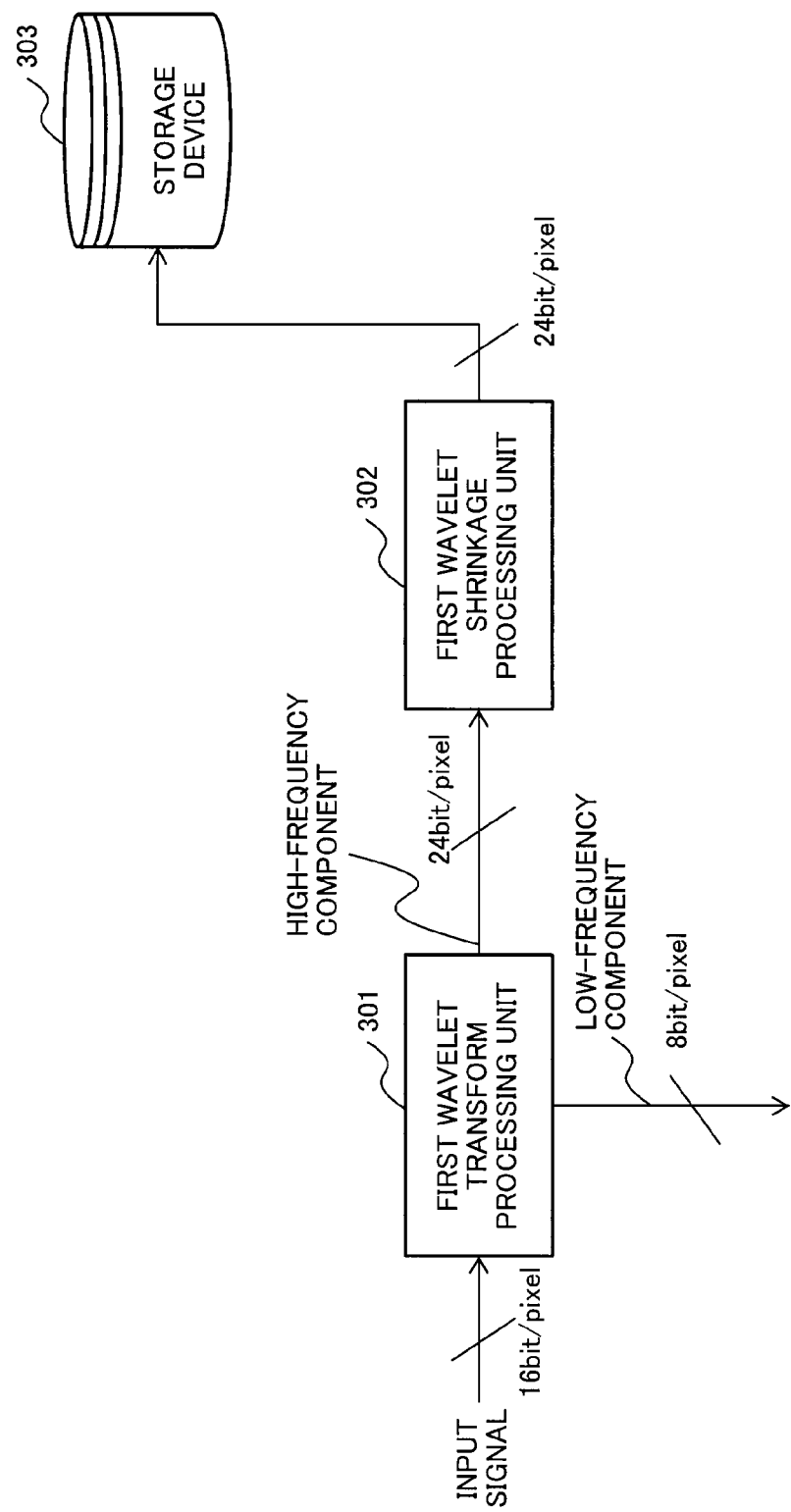
FIG. 9 is an explanatory diagram showing a comparative example with the first example.

In the comparative example in FIG. 9, 8 bits are added to each of the Y, U, and V components to hold a fractional value. That is, the number of bits per pixel is increased from 16, where originally Y=8 bits and U=V=4 bits, to 32, where Y=16 bits and U=V=8 bits. With reference to FIG. 9, one fourth of the total data is separated as a low-frequency component by the first wavelet transform processing unit 301. In other words, when the number of bits per pixel is 32, 8 bits are separated as a low-frequency component and the remaining 24 bits are separated as high-frequency components.

Reduction in storage capacity achieved by the first example is described with reference to the comparative example (FIG. 9).

With reference to FIG. 8, in the first example, after the input signal branches off at the branch point 213, the wavelet transform is performed twice (the second and third wavelet transform processing circuits 203 and 205). After the wavelet transform is performed once, the speed of accumulating lines is halved. Therefore, in order to accumulate 5 lines of data for the third wavelet transform processing circuit 205 in the line buffer 222, 10 lines of input signal is required.

In order to make both the line buffers 222 and 225 for the third wavelet transform processing 205 and the second inverse wavelet transform processing circuit 207 be full, 20 lines of input signal is required. In total, which includes 5 lines for the second wavelet transform processing circuit 203, 25 lines of input signal is accumulated in the storage device 200. For an image of the full high definition (full HD) quality in display resolution of 1920×1080 pixels, an accumulated storage amount in the storage device 200 is 750 kilobits that is 1920×16 bits×25 lines.

Figure 1:
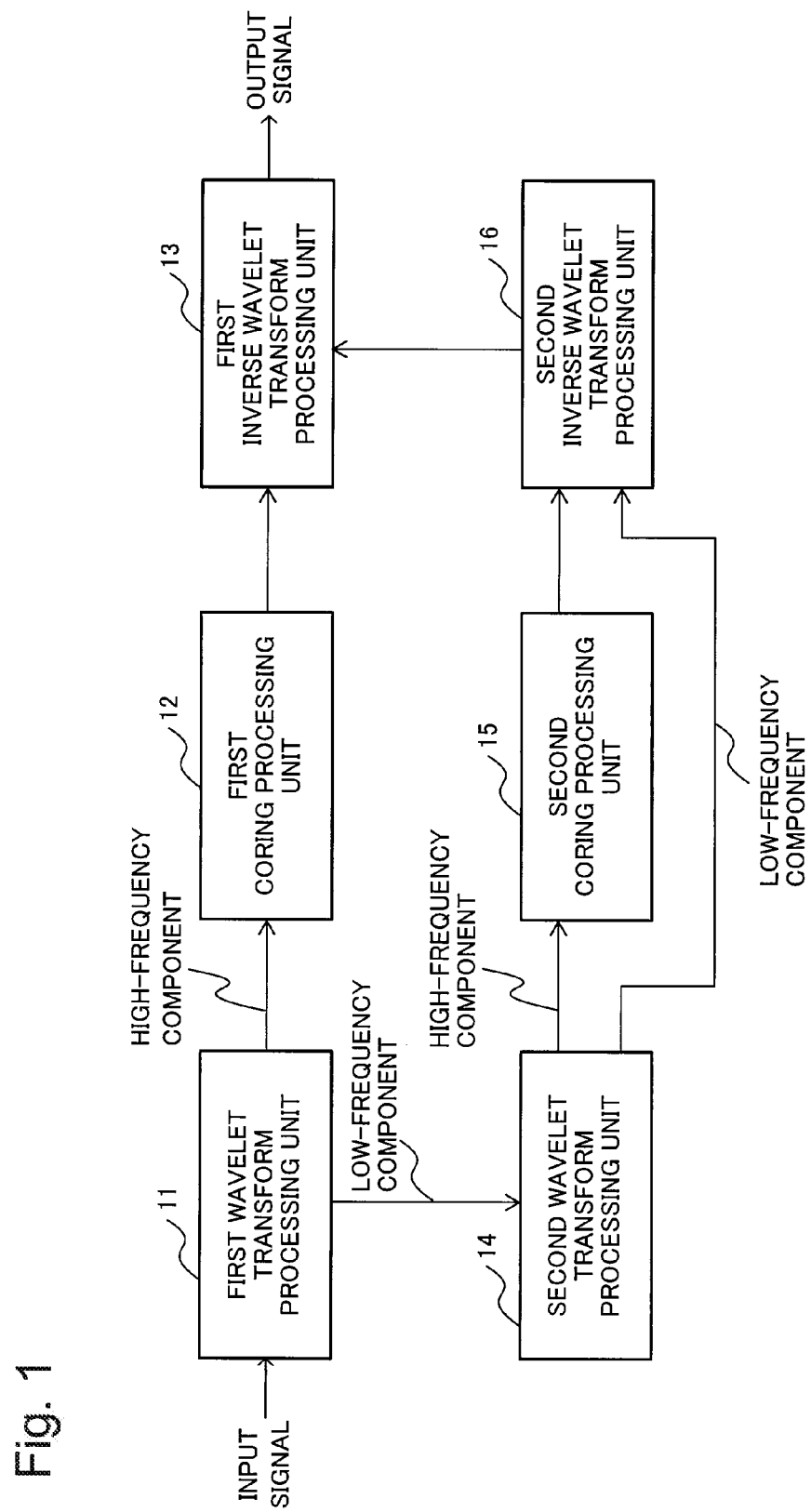
FIG. 1 is an explanatory diagram illustrating noise removal through a multi-resolution analysis.
Figure 2:
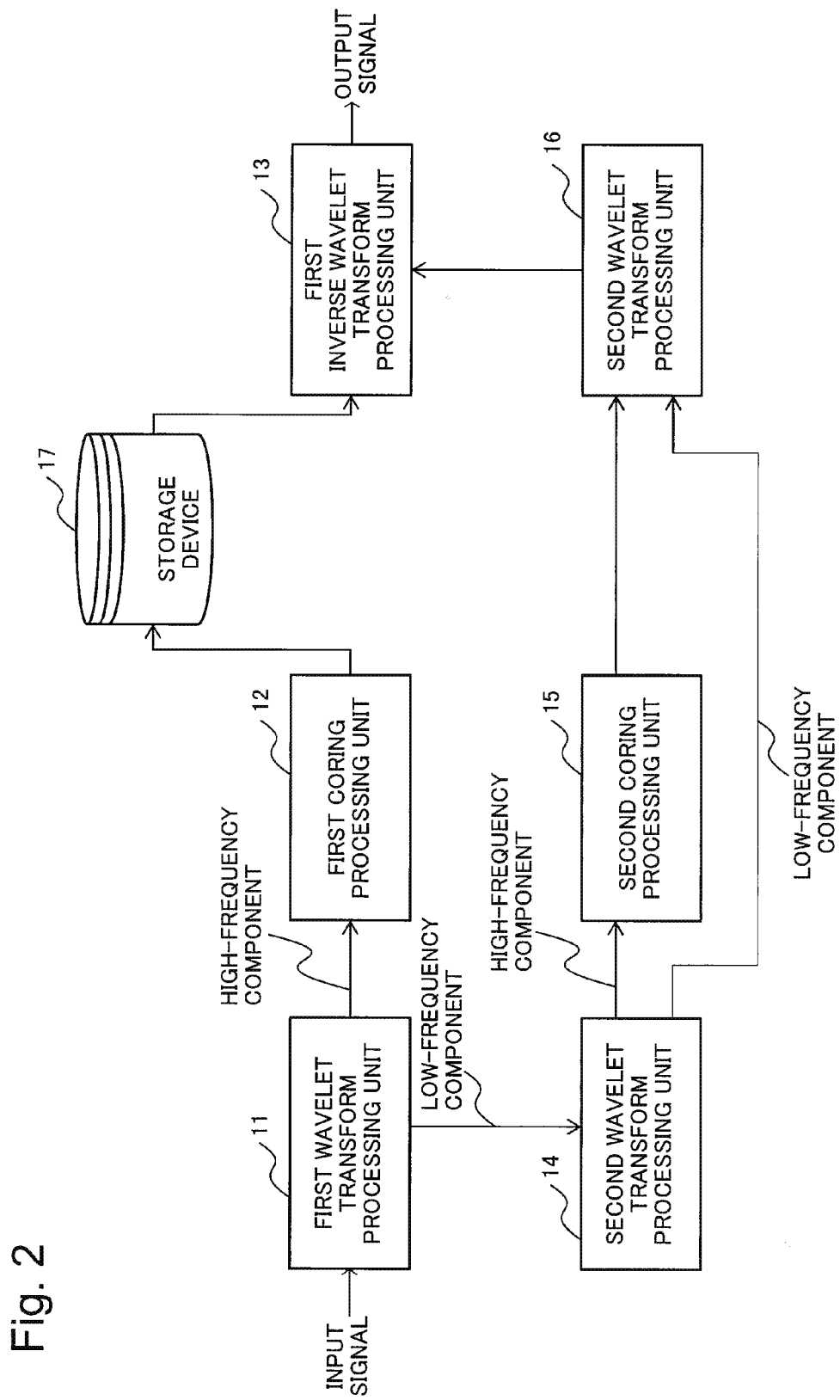
FIG. 2 is a diagram illustrating an example configuration which adds a storage device to FIG. 1 for timing adjustment.

The comparative example (FIG. 9), which is different from FIG. 8 in the location of the storage device, is different from the first example shown in FIG. 8 (the branch unit 213) in the location where a signal branches off into two channels. The storage device 303 in FIG. 9 corresponds to the storage device 17 in FIG. 2 described above. The comparative example shown in FIG. 9 does not need 5 lines corresponding to that for the second wavelet transform processing circuit 203 of the first example shown in FIG. 8, and thus the number of lines accumulated is 20 lines. In this comparative example, a storage amount accumulated in the storage device 303 is 1920×24 bits×20 lines (1 pixel=24 bits), i.e. 900 kilobits. Consequently, according to the first example shown in FIG. 8, an amount of stored data is reduced by 150 kilobits compared with the comparative example in FIG. 9.

Example 2

A second example of the present invention will now be described next. The second example corresponds to the first exemplary embodiment. Apparatuses or the like for taking photographs or moving images often use an image signal format, such as YUV422, in which pixels are reduced as appropriate in order to lessen the burden (load) on communications or image processing. For example, when an image is processed inside the apparatus, its image format is sometimes converted to, for example, RGB (Red, Green and Blue color model). The present example is able to handle such circumstances. FIG. 11 is a diagram illustrating an example of a structure of the second example. With reference to FIG. 11, a first YUV-to-RGB conversion processing unit 208, a second YUV-to-RGB conversion processing unit 209, and an RGB-to-YUV conversion processing unit 210 are added to the structure of the first example shown in FIG. 7. Except those units, the configuration in FIG. 11 is the same as the one in FIG. 7 (FIG. 8).

With reference to FIG. 11, an input signal stored in the storage device 200 is read out at the right timing to be inputted to the first YUV-to-RGB conversion processing unit 208 so that a signal is outputted from the first wavelet shrinkage processing unit (circuit) 202 to the first inverse wavelet transform processing unit (circuit) 204 at the same time as a signal is outputted from the second inverse wavelet transform processing unit (circuit) 207 to the first inverse wavelet transform processing unit (circuit) 204.

In FIG. 11, the input signals is assumed to be in YUV422, but may be in YUV420, YUV411 or the like, which is not limited to YUV422, and a sampling rate is not limited. Color space representations for the image format is not limited to YUV, and may be, for example, YCbCr, YPbPr, HSV, CMY, or RGB. A gray scale or single-color space with saturation levels only is also possible (not limited to the above description). Similarly to the input signal, in FIG. 11, an output signal is assumed to be in YUV422, but is not limited to YUV422.

Figure 12:
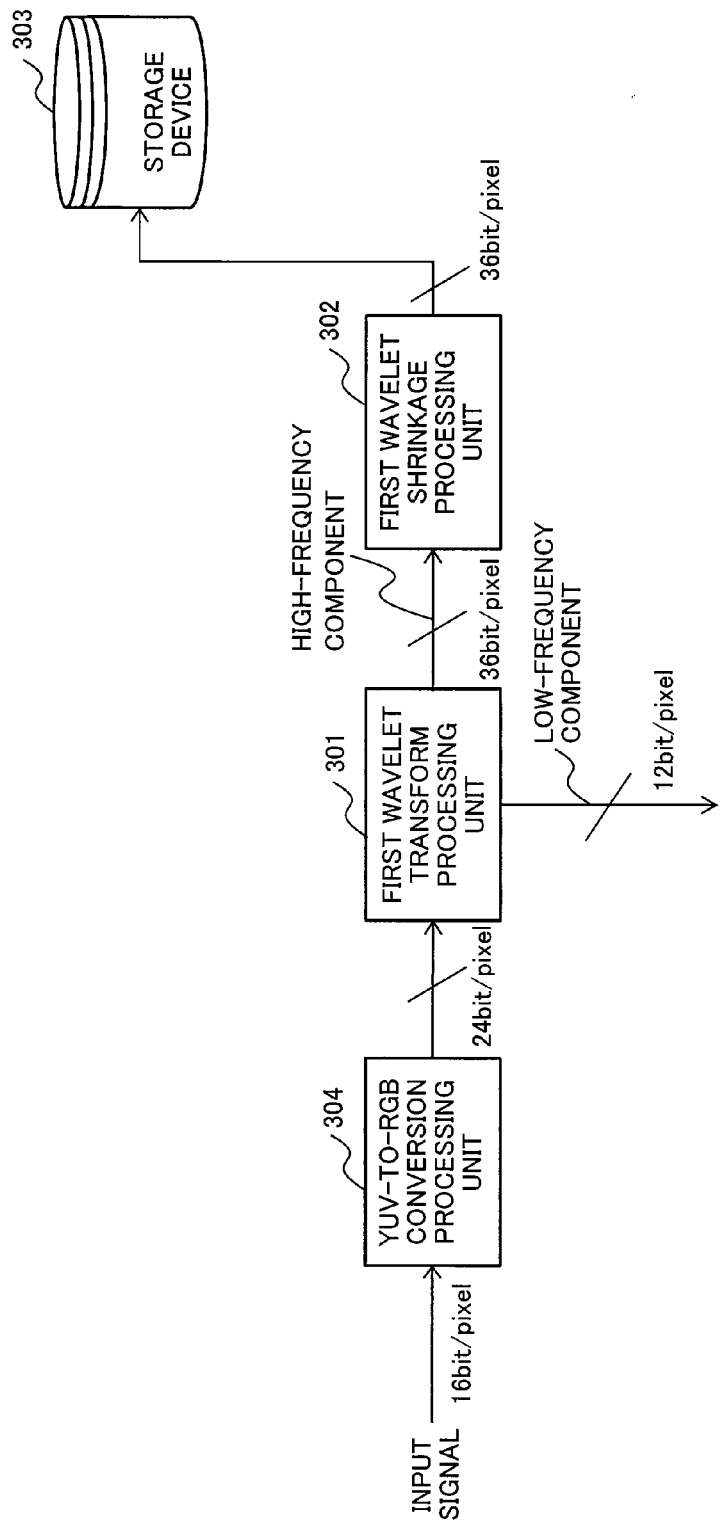
FIG. 12 is an explanatory diagram showing a comparative example with the second example.

With reference to FIG. 12, an increase in bit precision according to the present example is illustrated. The input signal is the same as that in the first example of the above first exemplary embodiment and assumed to be in YUV422 of 8-bit, and thus the number of bits per pixel is 16 bits. Conversion of the input signal from YUV to RGB is performed by the YUV-to-RGB conversion processing unit. In this example, each component of the R component, the G component and the B components is assumed to be of 8 bits, and accordingly bit precision per pixel is increased to 24 bits. A wavelet transform is performed on this signal. Similarly to the first example of the above first exemplary embodiment, 8 bits are used to represent a fraction part. As a result, the bit precision per pixel is 48 bits.

Data separated as a low-frequency component by a wavelet transform is one fourth of the total data. In other words, when the number of bits per pixel is 48, data of 12 bits are separated as a low-frequency component and the remaining 36 bits are separated as a high-frequency component.

Functional effects of the present example are described with reference to FIGS. 11 and 12. With reference to FIG. 11, an input signal branches off into two channels, one of which is then stored temporarily in the storage device 200. The number of lines held by the storage device is the same as that of the first example described above and is 25. When the input signal has 16 bits per pixel with the image quality of 1920×1080 pixels, the storage amount held by the storage device 200 is 1920×16 bits×25 lines=750 kilobits.

With reference to the comparative example in FIG. 9, concerning data held by the storage device 303, the bit precision is 36 bits/pixel, as illustrated in FIG. 12. Similarly to the first example described above, the number of lines held is 20, therefore the storage amount held by the storage device 303 in FIG. 9 is 1920×36 bits×20 lines=1300 kilobits. Consequently, the present example reduces an amount of stored data by 550 kilobits compared with the comparative example in FIG. 9.

Example 3

Figure 13:
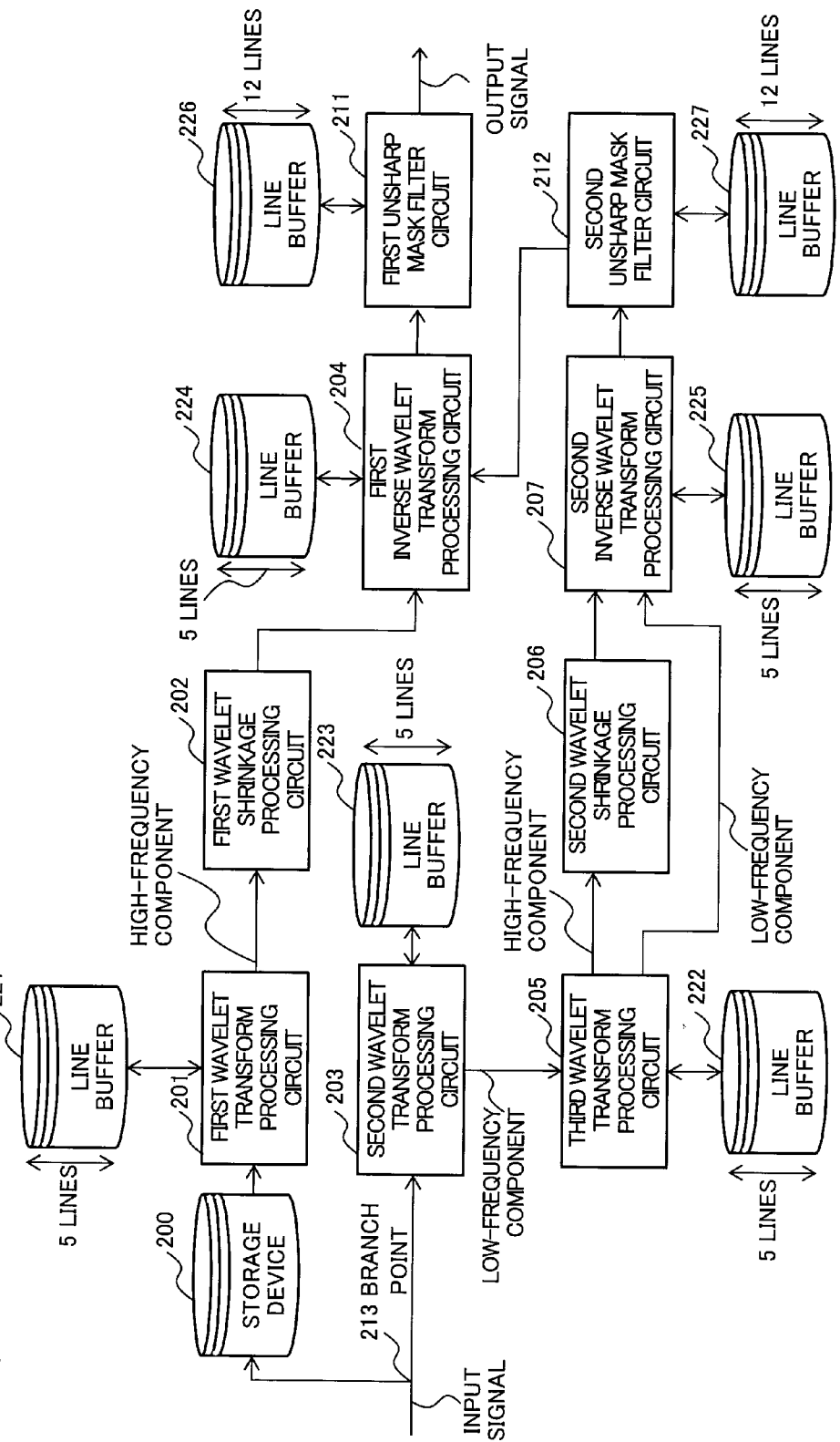
FIG. 13 is a diagram illustrating an example of a structure of a third example of the present invention.

FIG. 13 is a diagram illustrating an example of a structure of a third example of the present invention. The third example corresponds to the above-described second exemplary embodiment which includes compensation processing units. With reference to FIG. 13, the present example includes a first unsharp mask filter circuit 211 and a second unsharp mask filter circuit 212, in addition to the structure illustrated in FIG. 8. The remaining structure is the same as FIG. 8.

The first unsharp mask filter circuit 211 and the second unsharp mask filter circuit 212 correspond to the first compensation processing unit 110 and the second compensation processing unit 109 in FIG. 5, respectively. As an example of compensation processing, unsharp mask filters are used to perform sharpening. In general, because noise removal processing somewhat blunts edges in an image, sharpening is performed after noise removal. In the present example, a Gaussian filter is used for unsharp masking, for example. In the present example, a filter kernel size for the Gaussian filter is, but not limited to, 13×13 pixels. Accordingly the first unsharp mask filter circuit 211 and the second unsharp mask filter circuit 212 have line buffers 226 and 227, respectively, each of which has a capacity of 12-line data. The remaining structure is the same as FIG. 6.

In FIG. 13, an input signal stored in the storage device 200 is read out at the right timing to be inputted to the first wavelet transform processing circuit 201 so that a signal is outputted from the first wavelet shrinkage processing circuit 202 to the first inverse wavelet transform processing circuit 204 at the same time as a signal is outputted from the second unsharp mask filter circuit 212 to the first inverse wavelet transform processing unit (circuit) 204. As described in the above second exemplary embodiment, the timing is controlled by, for example, controlling a delay in readout of the input signal from the storage device 200 or using the control signal or the like which triggers readout to the storage device 200.

The input signal and bit precision for internal processing are the same as those in the first example of the above first exemplary embodiment. That is, it is assumed that the input signal is a two-dimensional image of 1920×1080 in the YUV422 format, and each of the Y component, the U component and the V component is of 8 bits.

According to the above assumption, the number of bits per pixel is 16. Concerning the internally processed data, 8 bits are added to each of the Y, U, and V components in order to hold a fractional value caused by a wavelet transform. That is, the number of bits per pixel is increased to 32. Data separated as a low-frequency component is one fourth of the total data. Thus, when the number of bits per pixel is 32, data of 8 bits is separated as a low-frequency component and the remaining 24 bits are separated as a high-frequency component.

Functional effects of the present example are described below. With reference to FIG. 13, an input signal branches off into two channels, one of which then stored temporarily in the storage device 200.

The number of lines held in the configuration of the present example is described below. The sum of the numbers of the lines held by the line buffers 222, 225, 227 for the third wavelet transform processing circuit 205, the second inverse wavelet transform processing circuit 207, and the second unsharp mask filter circuit 212, respectively, is 5+5+12=22 lines. Because passing through two stages of wavelet transform processing circuits (the wavelet transform processing circuits 203 and 205), for buffer lines to accumulate 22 lines in total, 44 lines as an input signal requires 22 lines of accumulating. With the additional 5 lines for the second wavelet transform processing circuit 203, 49 lines are required to be held temporarily.

When an input signal is of 16 bits per pixel with the image quality of 1920×1080 pixels, the storage amount held by the storage device 200 is 1920×16 bits×49 lines=1470 kilobits.

In the case of the comparative example, concerning the data held in the storage device 303 in FIG. 9, bit precision is 24 bits per pixel. The number of lines held by the storage device is 44. Thus, the storage amount held by the storage device 303 in FIG. 9 is 1920×24 bits×44 lines=1980 kilobits. Consequently, the third example reduces an amount of data by 510 kilobits compared with the comparative example in FIG. 9.

When the configuration of the present example includes, like the second example (FIG. 11), the image format conversion (YUV-to-RGB), which is not included, the functional effects of the present example (i.e., reduction effect in required storage capacity) becomes further noticeable.

The present invention is able to be applied to applications for removing noise that is mixed into digital signals outputted from sensors such as an imaging device in a digital camera. It is also able to be applied to applications for removing noise from digital signals converted from analog signals of a microphone or the like.

The whole or part of the exemplary embodiments described above can be described as, but not limited to, the following supplementary notes.

(Supplementary Note 1)

A noise removal system including a plurality of frequency transform processing means for transforming an input signal into a frequency-domain signal and for outputting the frequency-domain signal, the noise removal system comprising at least one set of:

frequency transform processing means for being inputted a low-frequency component in signals outputted from one of frequency-domain conversion processing means;

coring processing means for removing a noise component from a signal transformed into a frequency-domain; and inverse frequency transform means for transforming an original input signal into a same color signal based on a frequency-domain signal outputted from the coring processing means, wherein the noise removal system further comprises:

a storage device which holds an original input signal, which branches off into two channels.

(Supplementary Note 2)

The noise removal system according to Supplementary Note 1, comprising:

frequency transform processing means for transforming a signal read out from the storage device into a frequency-domain;

coring processing means for performing noise removal processing on a high-frequency component of a signal outputted from the frequency transform processing means; and inverse frequency transform processing means for setting as input a signal outputted from the coring processing means.

(Supplementary Note 3)

The noise removal system according to Supplementary Note 1 or 2, wherein data is read out from the storage device in synchronization with an input to one channel of two channels of input to the inverse frequency transform processing means.

(Supplementary Note 4)

The noise removal system according to any one of Supplementary Notes 1 to 3, comprising:

compensation processing means located subsequently to the inverse frequency transform processing means, wherein an output from the compensation processing means is inputted to inverse frequency transform processing means that is different from the inverse frequency transform processing means.

(Supplementary Note 5)

The noise removal system according to any one of Supplementary Notes 1 to 4, comprising:

color space conversion processing means for an input signal.

(Supplementary Note 6)

The noise removal system according to any one of Supplementary Notes 1 to 5, wherein the frequency transform processing means performs transform into a frequency-domain by using a wavelet transform, and the inverse frequency transform processing means transforms a frequency signal into a signal of a same color space as an input signal by using an inverse wavelet transform.

(Supplementary Note 7)

The noise removal system according to Supplementary Note 6, wherein the coring processing means removes noise included in the input signal by using wavelet shrinkage.

(Supplementary Note 8)

A noise removal processing circuit in which a plurality of frequency transform processing circuits transforming an input signal into a frequency-domain signal and outputting the frequency-domain signal is used, the noise removal circuit comprising one or more sets of:

a frequency transform processing circuit;

a frequency transform processing circuit to which a low-frequency component of a signal is inputted; the signal being outputted from the frequency-domain transform circuit is inputted;

a coring processing circuit which removes a noise component from a signal transformed into a frequency-domain; and a inverse frequency transform processing circuit which transforms a frequency-domain signal outputted from the coring processing circuit into a same color signal as an original input signal, wherein the noise removal circuit comprises:

a storage device which holds an original input signal branching off into two channels.

(Supplementary Note 9)

The noise removal processing circuit according to Supplementary Note 8, comprising:

a frequency transform processing circuit which transforms a signal read out from the storage device into a frequency-domain;

a coring processing circuit which performs noise removal processing on a high-frequency component of a signal outputted from the frequency transform processing circuit; and an inverse frequency transform processing circuit which sets as input a signal outputted from the coring processing circuit.

(Supplementary Note 10)

The noise removal processing circuit according to Supplementary Note 8 or 9, wherein data is read out from the storage device in synchronization with input to one channel in two channels of input to the inverse frequency transform processing circuit in one of the two channels.

(Supplementary Note 11)

The noise removal processing circuit according to Supplementary Note 9 or 10, comprising:

a compensation processing circuit located subsequently to the inverse frequency transform processing circuit, wherein an output from the compensation processing circuit is inputted to a inverse frequency transform processing circuit that is different from the aforementioned inverse frequency transform processing circuit.

(Supplementary Note 12)

The noise removal processing circuit according to any one of Supplementary Notes 9 to 11, comprising:

a color space conversion processing circuit for the input signal.

(Supplementary Note 13)

The noise removal processing circuit according to any one of Supplementary Notes 9 to 12, wherein the frequency transform processing circuit performs transforming into a frequency-domain signal by using a wavelet transform, and the inverse frequency transform processing circuit transforms a frequency signal into a signal in a same color space as an input signal by using an inverse wavelet transform.

(Supplementary Note 14)

The noise removal processing circuit according to Supplementary Note 13, wherein the coring processing circuit removes noise included in the input signal by using wavelet shrinkage.

(Supplementary Note 15)

A noise removal method comprising:

a plurality of frequency transform processing steps of transforming an input signal into a frequency-domain signal and outputting the frequency-domain signal, wherein the noise removal method comprising at least one set of:

a frequency transform processing step;

a frequency transform processing step of inputting a low-frequency component of a signal outputted from the frequency-domain transform step;

a coring processing step of removing a noise component from a signal transformed into frequency-domain; and a inverse frequency transform processing step of transforming a frequency-domain signal outputted from the coring processing step into a same color signal as an original input signal, and the noise removal method comprising:

holding in a storage device an original input signal which branches off into two channels.

(Supplementary Note 16)

The noise removal method according to Supplementary Note 15, the method comprising:

a frequency transform processing step of transforming a signal read out from the storage device into a frequency-domain;

a coring processing step of performing noise removal processing on a high-frequency component of a signal outputted from the frequency transform processing step; and an inverse frequency transform processing step of setting as input a signal outputted from the coring processing step.

(Supplementary Note 17)

The noise removal method according to Supplementary Note 15 or 16, wherein data is read out from the storage device in synchronization with input to one channel in two channels of input to the inverse frequency transform processing step.

(Supplementary Note 18)

The noise removal method according to any one of Supplementary Notes 15 to 17, the method comprising:

a compensation processing step subsequent to the inverse frequency transform processing step, wherein an output from the compensation processing step is inputted to a inverse frequency transform processing step that is different from the aforementioned inverse frequency transform processing step.

(Supplementary Note 19)

The noise removal method according to any one of Supplementary Notes 15 to 18, comprising:

a color space conversion processing step for an input signal.

(Supplementary Note 20)

The noise removal method according to any one of Supplementary Notes 15 to 19, wherein the frequency transform processing step includes performing transform into a frequency-domain signal by using a wavelet transform, and the inverse frequency transform processing step includes transforming a frequency signal into a signal in a same color space as that of an input signal by using an inverse wavelet transform.

(Supplementary Note 21)

The noise removal method according to Supplementary Note 20, wherein the coring-processing step includes removing noise included in the input signal by using wavelet shrinkage.

(Supplementary Note 22)

A noise removal method comprising:

writing an input signal, which branches off into at least two channels, of one channel temporarily into a storage device;

a first frequency transform processing process of transforming the input signal read out from the storage device into a frequency-domain to generate a first signal;

a second frequency transform processing process of transforming the input signal of another channel into a frequency-domain to generate a second signal;

a third frequency transform processing process of transforming the second signal into a frequency-domain to generate a third signal and a fourth signal in a first frequency band and a second frequency band;

a first inverse frequency transform processing process;

a second inverse frequency transform processing process of inputting directly or indirectly the third signal, inputting the fourth signal, and generating a third transformed signal which is produced through inverse frequency transform performed on inputted signals, wherein the first inverse frequency transform processing process includes inputting directly or indirectly the first signal, inputting directly or indirectly the third transformed signal, and outputting a signal produced through inverse frequency transform performed on inputted signals, and at least one of (A) and (B) holds true:

(A) the first inverse frequency-processing process includes inputting, as an indirect input of the first signal, a first transformed signal produced through coring processing performed on the first signal; and (B) the second inverse frequency transform processing process includes inputting, as an indirect input of the third signal, a second transformed signal produced through coring processing performed on the third signal.

(Supplementary Note 23)

The noise removal method according to Supplementary Note 22, wherein the input signal in the one channel is read out from the storage device so that the first signal from the first frequency transform processing process is directly or indirectly inputted to the first inverse frequency transform processing process at a timing when the third transformed signal generated in the second inverse frequency transform processing process is directly or indirectly inputted to the first inverse frequency transform processing process.

(Supplementary Note 24)

The noise removal method according to Supplementary Note 22 or 23, comprising at least one of:

a first compensation processing process of outputting a signal produced through preset correction and/or further noise removal processing performed on the signal outputted from the first inverse frequency transform processing process; and a second compensation processing process of outputting a fourth converted signal produced through preset correction and/or further noise removal processing performed on the third transformed signal outputted from the second inverse frequency transform processing unit, wherein the first inverse frequency transform processing process includes inputting, as an indirect input of the third converted signal from the second inverse frequency transform processing process, the fourth transformed signal produced through correction and/or further noise removal processing in the second compensation processing process performed on the third transformed signal from the second inverse frequency transform processing process.

(Supplementary Note 25)

The noise removal method according to Supplementary Note 22 or 23, comprising:

a first compensation processing process of outputting a signal produced through preset correction and/or further noise removal processing performed on a signal on which the inverse frequency transform is performed in the first inverse frequency transform processing process; and a second compensation processing process of outputting a fourth transformed signal produced through preset correction and/or further noise removal processing performed on the third transformed signal outputted from the second inverse frequency transform processing process, wherein the first inverse frequency transform processing process includes, when the third transformed signal is indirectly inputted from the second inverse frequency transform processing process, inputting the fourth transformed signal produced through correction and/or further noise removal processing in the second compensation processing process performed on the third transformed signal from the second inverse frequency transform processing process.

(Supplementary Note 26)

The noise removal method according to any one of Supplementary Notes 22 to 25, comprising:

a first conversion-processing process of performing preset color space conversion processing on the input signal read out from the storage device in the one channel and supplying a converted signal to the first frequency transform processing process as the input signal;

a second conversion-processing process of performing preset color space conversion processing on the input signal in the other channel and supplying a converted signal to the second frequency transform processing process as the input signal; and a third conversion-processing process of performing inverse conversion of the color space conversion processing on an output signal from the first inverse frequency transform processing process.

(Supplementary Note 27)

The noise removal method according to any one of Supplementary Notes 22 to 26, wherein each of the frequency transform processing processes includes performing a wavelet transform, and each of the inverse frequency transform processing processes includes performing an inverse wavelet transform.

(Supplementary Note 28)

A program causing a computer to execute processing comprising:

first frequency transform processing of transforming an input signal read out and inputted from a storage device into a frequency-domain to output a first signal, the input signal branching off into at least two channels, the input signal of one channel being temporarily written temporarily in the storage device;

second frequency transform processing of transforming the inputted input signal of the other channel into a frequency-domain to output a second signal;

third frequency transform processing of transforming the second signal inputted from the second frequency domain transform processing into a frequency-domain to output a third signal and a fourth signal in a first frequency band and a second frequency band;

first inverse frequency transform processing;

second inverse frequency transform processing of performing inverse frequency transform on inputted signals that are the third signal directly or indirectly inputted from the third frequency transform processing and the fourth signal inputted from the third frequency transform processing to output a third transformed signal, wherein in the first inverse frequency transform processing, the first signal is directly or indirectly inputted from the first frequency transform processing, the third transformed signal is directly or indirectly inputted from the second inverse frequency transform processing, and a signal produced through inverse frequency transform performed on inputted signals is outputted, and the program causes the computer to execute at least one of below-described (A) and (B):

(A) the first inverse frequency processing in which a first transformed signal is inputted as an indirect input of the first signal, the first transformed signal being produced through first coring processing to remove noise performed on the first signal from the first frequency transform processing; and (B) the second inverse frequency processing in which a second transformed signal is inputted as an indirect input of the third signal, the second transformed signal being produced through second coring processing to remove noise performed on the third signal from the third frequency transform processing.

(Supplementary Note 29)

The program according to Supplementary Note 28, causing a computer to execute:

processing of reading out the input signal in the one channel from the storage device so that the first signal from the first frequency transform processing is directly or indirectly inputted to the first inverse frequency transform processing at a timing when the third transformed signal from the second inverse frequency transform processing is directly or indirectly inputted to the first inverse frequency transform processing.

(Supplementary Note 30)

The program according to the Supplementary Note 28 or 29, further comprising at least one of:

first compensation processing of outputting a signal produced through preset correction and/or further noise removal processing performed on the signal on which the inverse frequency transform in the first inverse frequency transform processing; and second compensation processing of outputting a fourth transformed signal produced through preset correction and/ or further noise removal processing performed on the third transformed signal outputted from the second inverse frequency transform processing, wherein in the first inverse frequency transform processing, when the third transformed signal is indirectly inputted from the second inverse frequency transform processing, the fourth transformed signal is inputted, the fourth transformed signal being produced through correction and/or further noise removal processing in the second compensation processing performed on the third transformed signal from the second inverse frequency transform processing.

(Supplementary Note 31)

The program according to any one of Supplementary Notes 28 to 30, causing a computer to execute:

first conversion processing of performing preset designated color space conversion processing on the input signal read out from the storage device of the one channel and supplying a converted signal to the first frequency transform processing as the input signal;

second conversion processing of performing preset designated color space conversion processing on the input signal of the other channel and supplying a converted signal to the second frequency transform processing as the input signal; and third conversion processing of performing inverse conversion of the color space conversion processing on an output signal from the first inverse frequency transform processing.

(Supplementary Note 32)

The program according to any one of Supplementary Notes 28 to 31, wherein the respective frequency-conversion processing includes performing a wavelet transform, and the respective inverse frequency transform processing includes performing an inverse wavelet transform.

(Supplementary Note 33)

A multi-resolution analysis system comprising:

at least two frequency transform processing units of an input stage of a multi-resolution analysis, wherein an input signal branches off into at least two channels, the input signal of one channel being temporarily buffered in a storage device that is located before a first frequency transform processing unit in the input stage, the input signal in other channel is directly inputted to a second frequency transform processing unit in the input stage, and further frequency transform processing is performed on an output from the second frequency transform processing unit, an inverse frequency transform processing unit of an output stage, to which an output signal is inputted directly or indirectly from the first frequency transform processing unit in the input stage and an output signal is inputted directly or indirectly from an inverse frequency transform processing unit located in a stage immediately before the output stage, outputs a signal produced through inverse frequency-domain transform.

(Supplementary Note 34)

The multi-resolution analysis system according to Supplementary Note 33, controlling readout of the input signal, from the storage device, to the first frequency transform processing unit in the input stage so that an output signal is directly or indirectly inputted from the first frequency transform processing unit in the input stage to the inverse frequency transform processing unit in the output stage at a timing when an output signal is directly or indirectly inputted from the inverse frequency transform processing unit in a stage immediately before the output stage to the inverse frequency transform processing unit in the output stage.

The respective disclosures of the patent and nonpatent literatures described above are incorporated herein by reference. Modifications and adjustments of exemplary embodiments and examples may be made within the framework of the entire disclosure (including the scope of the claims) of the present invention, and also based on fundamental technological concepts thereof. Furthermore, various combinations and selections of various disclosed elements (including each of the elements of each of the supplementary notes, each of the elements of each of the examples, each of the elements of each of the drawings, and the like) are possible within the scope of the claims of the present invention. That is, the present invention clearly includes every type of transformation and modification that a person skilled in the art can realize according to the entire disclosure including the scope of the claims of the present invention and to technological concepts thereof.

REFERENCE SIGNS LIST

11 First wavelet transform processing unit
12 First coring processing unit
13 First inverse wavelet transform processing unit
14 Second wavelet transform processing unit
15 Second coring processing unit
16 Second inverse wavelet transform processing unit
17 Storage device
100 Storage device
101 Processing device
102 First frequency transform processing unit
103 First coring processing unit
104 First inverse frequency transform processing unit
105 Second frequency transform processing unit
106 Third frequency transform processing unit
107 Second coring processing unit
108 Second inverse frequency transform processing unit
109 Second compensation processing unit
110 First compensation processing unit
111 Branch point (branch unit)
200 Storage device
201 First wavelet transform processing unit (first wavelet transform processing circuit)
202 First wavelet shrinkage processing unit (first wavelet shrinkage processing circuit)
204 First inverse wavelet transform processing unit (first inverse wavelet transform processing circuit)
203 Second wavelet transform processing unit (second wavelet transform processing circuit)
205 Third wavelet transform processing unit (third wavelet transform processing circuit)
206 Second wavelet shrinkage processing unit (second wavelet shrinkage processing circuit)
207 Second inverse wavelet transform processing unit (second inverse wavelet transform processing circuit)
208 First YUV-to-RGB conversion processing unit
209 Second YUV-to-RGB conversion processing unit
210 RGB-to-YUV conversion processing unit
211 First unsharp mask filter circuit
212 Second unsharp mask filter circuit
213 Dividing point (dividing unit)
221 to 227 Line buffer
301 First wavelet transform processing unit
302 First wavelet shrinkage processing unit
303 Storage device

What is claimed is:

1. A noise removal system comprising:
an input signal branching off into at least a first channel and a second channel at a branch unit, the input signal of the first channel being stored in a storage device;
a memory that stores a set of instructions; and
at least one CPU (Central Processing Unit) configured to execute the set of instructions to operate as:
a first frequency transform processing unit which transforms the input signal from the storage device into a frequency-domain signal to output a first signal;
a second frequency transform processing unit which transforms the input signal, from the second channel into a frequency-domain signal to output a second signal;
a third frequency transform processing unit which transforms the second signal from the second frequency transform processing unit into a frequency-domain signal and outputs a third signal and a fourth signal in a first frequency band and a second frequency band;
a first inverse frequency transform processing unit;
wherein the third and fourth signals are inputted directly or indirectly to a second inverse frequency transform processing unit, and the second inverse frequency transform processing unit outputs a third transformed signal produced through inverse frequency transform on the inputted signals; and
at least one of a first coring processing unit and a second coring processing unit, wherein
the first signal from the first frequency transform processing unit and the third transformed signal from the second inverse frequency transform processing unit are inputted directly or indirectly to the first inverse frequency transform processing unit, and the first inverse frequency transform processing unit outputs a signal produced through inverse frequency transform performed on the inputted signals,
the first coring processing unit outputs a first transformed signal produced through noise removal on the first signal from the first frequency transform processing unit, the first transformed signal from the first coring processing unit being inputted as indirect input of the first signal to the first inverse frequency transform processing unit, and the second coring processing unit outputs a second transformed signal produced through noise removal on the third signal from the third frequency transform processing unit, the second transformed signal from the second coring processing unit being inputted as an indirect input of the third signal to the second inverse frequency transform processing unit.

2. The noise removal system according to claim 1, wherein the input signal in the first channel is read out from the storage device so that the first signal from the first frequency transform processing unit is directly or indirectly inputted to the first inverse frequency transform processing unit at a time when the third transformed signal from the second inverse frequency transform processing unit is directly or indirectly inputted to the first inverse frequency transform processing unit.

3. The noise removal system according to claim 1, wherein the at least one CPU is further configured to operate as at least one of:

a first compensation processing unit which outputs a signal produced through preset correction and further noise removal processing performed on a signal on which the inverse frequency transform is performed by the first inverse frequency transform processing unit; and a second compensation processing unit which outputs a fourth transformed signal produced through preset correction and further noise removal processing performed on the third transformed signal outputted from the second inverse frequency transform processing unit, wherein the fourth transformed signal is inputted to the first inverse frequency transform processing unit, in a configuration where the third transformed signal from the second inverse frequency transform processing unit is indirectly inputted, the fourth transformed signal being produced through correction and further noise removal processing by the second compensation processing unit performed on the third transformed signal outputted from the second inverse frequency transform processing unit.

4. The noise removal system according to claim 1, wherein the at least one CPU is further configured to operate as:

a first conversion processing unit which performs preset designated color space conversion processing on the input signal from the storage device in the first channel and supplies a signal on which the color space conversion processing is performed to the first frequency transform processing unit as the input signal;

a second conversion processing unit which performs preset designated color space conversion processing on the input signal in the second channel and supplies a signal on which the color space conversion processing is performed to the second frequency transform processing unit as the input signal;

a third conversion processing unit which performs inverse conversion of the color space conversion processing on an output signal from the first inverse frequency transform processing unit.

5. The noise removal system according to claim 1, wherein each of the frequency transform processing units performs a wavelet transform and each of the inverse frequency transform processing units performs an inverse wavelet transform.

6. A noise removal method comprising:

a process of storing temporarily into a storage device an input signal of a first channel, the input signal branching off into at least the first channel and a second channel;

a first frequency transform processing process of transforming the input signal from the storage device into a frequency-domain to generate a first signal;

a second frequency transform processing process of transforming the input signal of the second channel into a frequency-domain to generate a second signal;

a third frequency transform processing process of transforming the second signal into a frequency-domain to generate a third signal and a fourth signal in a first frequency band and a second frequency band;

a first inverse frequency transform processing process;

wherein the third and fourth signals are inputted directly or indirectly to a second inverse frequency transform processing process, and the second inverse transform process generates a third transformed signal which is produced through inverse frequency transform performed on the inputted signals; and at least one of a first coring processing process and a second coring processing process; wherein the first signal and the third transformed signal are inputted directly or indirectly to the first inverse frequency transform processing process, and the signal produced through inverse frequency transform performed on inputted signals is outputted, in the first coring processing process, a first transformed signal is outputted, the first transformed signal being produced through noise removal on the first signal from the first frequency transform processing process, the first transformed signal from the first coring processing process being inputted in the first inverse frequency transform process as an indirect input of the first signal, and in the second coring processing process, a second transformed signal is outputted, the second transformed signal being produced through noise removal on the third signal from the third frequency transform processing process, the second transformed signal from the second coring processing process being inputted in the second inverse frequency transform processing process as an indirect input of the third signal.

7. The noise removal method according to claim 6, wherein the input signal in the first channel is outputted from the storage device so that the first signal from the first frequency transform processing process is directly or indirectly inputted to the first inverse frequency transform processing process at a time when the third transformed signal generated in the second inverse frequency transform processing process is directly or indirectly inputted to the first inverse frequency transform processing process.

8. The noise removal method according to claim 6, the method comprising at least one of:

a first compensation processing process of outputting a signal produced through preset correction and further noise removal processing performed on the signal outputted from the first inverse frequency transform processing process; and a second compensation processing process of outputting a fourth transformed signal produced through preset correction and further noise removal processing performed on the third transformed signal outputted from the second inverse frequency transform processing process, wherein in the first inverse frequency transform processing process, the fourth transformed signal is inputted as an indirect input of the third transformed signal from the second inverse frequency transform processing process, the fourth transformed signal being produced through correction and further noise removal processing in the second compensation processing process performed on the third transformed signal from the second inverse frequency transform processing process.

9. A non-transitory computer readable medium storing a program causing a computer to execute:

processing of storing temporarily into a storage device an input signal in a first channel, the input signal branching off into at least the first channel and a second channel;

first frequency transform processing, in which the input signal from the storage device is transformed into a frequency domain to output a first signal;

second frequency transform processing, in which the input signal from the second channel is transformed into a frequency-domain to output a second signal;

third frequency transform processing, in which the second signal from the second frequency domain transform processing is transformed into a frequency-domain to output a third signal and a fourth signal in a first frequency band and a second frequency band;

first inverse frequency transform processing; wherein the third and fourth signals from the third frequency transform processing are inputted directly or indirectly to second inverse frequency transform processing, outputting a third transformed signal which is produced through inverse frequency transform performed on inputted signals; and at least one of a first coring processing and second coring processing, wherein the first signal from the first frequency transform processing and the third transformed signal from the second inverse frequency transform processing is directly or indirectly inputted to first inverse frequency transform processing outputting a signal produced through inverse frequency transform performed on the inputted signals, in the first coring processing, a first transformed signal is outputted, the first transformed signal being produced through noise removal on the first signal from the first frequency-conversion processing, the first transformed signal from the first coring processing being inputted as an indirect input of the first signal to the first inverse frequency transform processing, and in the second coring processing, a second transformed signal is outputted, the second transformed signal being produced through noise removal on the third signal from the third frequency transform processing, the second transformed signal from the second coring processing being inputted as an indirect input of the third signal to the second inverse frequency transform processing.

10. The non-transitory computer readable medium according to claim 9, storing the program causing a computer to execute:

processing of reading out the input signal in the first channel from the storage device so that the first signal from the first frequency transform processing is directly or indirectly inputted to the first inverse frequency transform processing at a time when the third transformed signal from the second inverse frequency transform processing is directly or indirectly inputted to the first inverse frequency transform processing.

11. The noise removal system according to claim 1, wherein the input signal of the first channel is read out from the storage device after elapse of a time after the input signal was stored in the storage device.

12. The noise removal method according to claim 6, wherein the input signal of the first channel is read out from the storage device after elapse of a time after the input signal was stored into the storage device.

13. The non-transitory computer readable medium according to claim 9, storing the program further causing a computer to execute:

processing of reading out the input signal of the first channel from the storage device after elapse of a time after the input signal was stored into the storage device.

* * * * *